United States Patent
Kajita et al.

(10) Patent No.: US 8,455,053 B2
(45) Date of Patent: Jun. 4, 2013

(54) SEPARATOR, BATTERY USING THE SAME, AND METHOD FOR MANUFACTURING SEPARATOR

(75) Inventors: Atsushi Kajita, Fukushima (JP); Yukako Teshima, Fukuoka (JP); Hiroshi Imoto, Fukushima (JP); Takehiko Tanaka, Fukushima (JP); Hiroshi Horiuchi, Fukushima (JP)

(73) Assignee: Sony Corporation, Tokyo (JP)

( * ) Notice: Subject to any disclaimer, the term of this patent is extended or adjusted under 35 U.S.C. 154(b) by 790 days.

(21) Appl. No.: 12/167,005

(22) Filed: Jul. 2, 2008

(65) Prior Publication Data

US 2009/0011337 A1 Jan. 8, 2009

(30) Foreign Application Priority Data

Jul. 6, 2007 (JP) ................................. 2007-179088
Sep. 11, 2007 (JP) ................................. 2007-235392

(51) Int. Cl.
*B05D 3/02* (2006.01)
*H01M 2/14* (2006.01)
*H01M 2/16* (2006.01)
*H01M 2/18* (2006.01)

(52) U.S. Cl.
USPC ..... 427/387; 427/372.2; 427/384; 427/385.5; 429/129; 429/142; 429/144; 429/247; 429/251; 429/252

(58) Field of Classification Search
USPC ............... 429/249, 129, 142, 144, 247, 251, 429/252; 427/372.2, 384, 385.5, 387
See application file for complete search history.

(56) References Cited

U.S. PATENT DOCUMENTS

| 4,650,730 | A | 3/1987 | Lundquist et al. |
| 4,731,304 | A | 3/1988 | Lundquist et al. |
| 5,639,573 | A | 6/1997 | Oliver et al. |
| 5,658,685 | A | 8/1997 | Oliver |
| 6,447,958 | B1 | 9/2002 | Shinohara et al. |
| 7,138,207 | B2 | 11/2006 | Yamaguchi et al. |
| 2006/0177732 | A1* | 8/2006 | Visco et al. .................. 429/144 |
| 2006/0222955 | A1 | 10/2006 | Ogawa et al. |

FOREIGN PATENT DOCUMENTS

| EP | 1889867 | 2/2008 |
| JP | 62-037871 | 2/1987 |
| JP | 63-308866 | 12/1988 |
| JP | 02-296840 | 12/1990 |

(Continued)

OTHER PUBLICATIONS

Machine translation of JP 2002008730 A, Ito et al., Jan. 2002.*

(Continued)

*Primary Examiner* — Basia Ridley
*Assistant Examiner* — Sean P Cullen
(74) *Attorney, Agent, or Firm* — K&L Gates, LLP

(57) ABSTRACT

A separator which includes a covering layer in which a fine framework of polyolefin resin is coated with a glass layer and an exposed layer in which the polyolefin resin is exposed is provided. A battery is provided having a cathode and an anode, an electrolyte, and a separator where the separator has the covering layer in which the fine framework of polyolefin resin is coated with the glass layer and a method for manufacturing a separator including the step of coating a fine framework of polyolefin resin with the glass layer by applying a precursor containing viscous liquid product which contains only polysilazane compound or a mixture of viscous liquid product which contains only polysilazane compound with polycarbosilazane compound to the polyolefin resin and placing the precursor applied polyoleline resin in a water bath to dry.

1 Claim, 13 Drawing Sheets

FOREIGN PATENT DOCUMENTS

| | | |
|---|---|---|
| JP | 04-38101 | 2/1992 |
| JP | 04-181651 | 6/1992 |
| JP | 05-013062 | 1/1993 |
| JP | 05-062662 | 3/1993 |
| JP | 10-324758 | 12/1998 |
| JP | 2000-030686 | 1/2000 |
| JP | 2000-100408 | 4/2000 |
| JP | 3175730 | 4/2001 |
| JP | 2001-266949 | 9/2001 |
| JP | 2002008730 A * | 1/2002 |
| JP | 2002-216734 | 8/2002 |
| JP | 2003-086162 | 3/2003 |
| JP | 3419393 | 4/2003 |
| JP | 2004-014127 | 1/2004 |
| JP | 3565861 | 6/2004 |
| JP | 3680759 | 5/2005 |
| JP | 3721639 | 9/2005 |
| JP | 2006-059733 | 3/2006 |
| JP | 2006-164873 | 6/2006 |
| JP | 2006-286531 | 10/2006 |
| JP | 2006-289657 | 10/2006 |
| JP | 2006-348280 | 12/2006 |
| JP | 2007-123233 | 5/2007 |
| JP | 2007-280781 | 10/2007 |
| JP | 2007-125821 | 5/2010 |
| WO | WO 2006068428 A1 * | 6/2006 |

OTHER PUBLICATIONS

C.S. Myers, Solubility Characteristics of Polyethylene Resin, 1954, Journal of Polymer Science, 8, 549-564.*
Japanese Office Action (JP 2007-235392) dated Dec. 22, 2009.
Japanese Office Action issued on Oct. 20, 2009, for corresponding Japanese Patent Application JP 2007-179088.

* cited by examiner

SEPARATOR, BATTERY USING THE SAME, AND METHOD FOR MANUFACTURING SEPARATOR

CROSS REFERENCES TO RELATED APPLICATIONS

The present application claims priority to Japanese Patent Application No. 2007-179088 filed on Jul. 6, 2007 and Japanese Patent Application No. 2007-235392 filed on Sep. 11, 2007, the entire contents of which being incorporated herein by reference.

BACKGROUND

The present disclosure relates to a separator, battery using the same, and a method for manufacturing the separator.

With the remarkable development of the portable electronics in recent years, cellular phones and notebook computers have been recognized as infrastructure technologies for an advanced information society. The research and development related to the high-performance of these devices have been intensively proceeded. As power consumption increases with the high-performance, there is a need for shortening the drive time. In order to ensure the drive time above a certain level, an essential condition is to increase an energy density of a secondary battery to be used as a driving source. Thus, for example, a lithium-ion secondary battery is expected.

In the lithium-ion secondary battery, the internal energy is large and thus a high safety is necessary during abnormal conditions such as an internal short circuit and an external short circuit. For safety measures, a polyolefin separator produced by drawing polyolefin has been used. In order to ensure the safety, the polyolefin separator has a shutdown function to make electric currents interrupted in the case where the battery abnormally generates heat. The shutdown function is a function in which the separator is fused at a temperature near the melting point and a hole area is sealed, thereby interrupting electric currents.

However, the shrinkage of the separator occurs when it is shut down. Thus, a secondary defect such as an internal short-circuit may be caused by the contact of a cathode and an anode. It is necessary that the heat shrinkage is reduced by improving the heat resistance of the separator in order to improve the safety. For example, a separator in which an inorganic oxide porous membrane is formed on an organic porous membrane in order to improve the safety is described in Japanese Patent Application Laid-Open (JP-A) No. 2004-14127.

On the other hand, although it is not related to the structure of the separator, the production method of $SiO_2$ based ceramic coating film which contains polysilazane as a raw material is described in Japanese Patent No. 3771314.

Considering of high capacity and high safety of the lithium-ion secondary battery, a sufficient capacity cannot be obtained by using only polyolefin resin fine porous membrane in related art. Therefore, it is necessary to give the function to the polyolefin resin fine porous membrane. As a method for giving the function to the polyolefin resin fine porous membrane, for example, a method for coating resins having different properties on the polyolefin resin fine porous membrane has been proposed. For example, a separator in which resins such as polyvinylidene fluoride and polypropylene is coated on the polyolefin resin fine porous membrane in order to improve the electrochemical stability of the separator is disclosed in JP-A No. 2006-286531.

It is desirable to provided a separator capable of reducing the heat shrinkage and improving safety, battery using the same, and a method for manufacturing the separator.

In the separator described in JP-A No. 2006-286531, the electrochemical stability of the separator can be improved. However, a resin layer formed by coating is inferior in the impregnation property of the electrolytic solution and the ionic conductivity. Therefore, satisfactory battery characteristics could not be obtained.

Therefore, it is also desirable to provided a separator which is excellent in impregnation property of the electrolytic solution and to which the resin function is imparted without impairing the ionic conductivity and a battery using the same.

SUMMARY

According to an embodiment, there is provided a separator which includes a covering layer in which a fine framework of polyolefin resin is coated with a glass layer.

According to an embodiment, there is provided a battery which includes a cathode and an anode, an electrolyte, and a separator where the separator has the covering layer in which the fine framework of polyolefin resin is coated with the glass layer.

According to an embodiment, there is provided a method for manufacturing a separator which includes the step of coating a fine framework of polyolefin resin with the glass layer by applying a precursor containing viscous liquid product which contains only polysilazane compound or a mixture of viscous liquid product which contains only polysilazane compound with polycarbosilazane compound to the polyolefin resin and placing the precursor applied polyolefine resin in a water bath to dry.

In the embodiments, a secondary defect such as an internal short-circuit which is caused by the heat shrinkage of the separator can be prevented.

In the embodiment, the fine framework of polyolefin resin of the separator is coated with the glass layer and this feature is different from the separator in related art in which a porous silica layer is simply formed on the surface of an organic porous layer. Further, the separator which is excellent in heat resistance even if it is thinner than the separator in related art can be obtained by having such a structure.

Further, the method for manufacturing the separator according to the embodiment differs from the method for manufacturing the separator described in related art on the point that the separator can be manufactured without winding with a separator sheet according to the present embodiment.

According to an embodiment, there is provided a separator which includes at least a first resin layer containing polyolefin resin and a second resin layer containing a resin with the structure in which a framework of 1 μm or less in diameter is joined in the form of a three-dimensional mesh.

According to an embodiment, there is provided a batter), which includes a cathode and an anode, an electrolyte, and a separator where the separator has at least a first resin layer containing polyolefin resin and a second resin layer containing a resin with the structure in which a framework of 1 μm or less in diameter is joined in the form of a three-dimensional mesh.

In the embodiments, the first resin layer containing polyolefin resin has a shutdown function. A second resin layer containing the resin with a structure in which a framework of 1 μm or less in diameter is joined in the form of a three-dimensional mesh is excellent in impregnation property of the electrolytic solution and the resin function can be imparted to the separator without impairing the ionic conductivity.

According to the embodiments, the heat shrinkage of the separator can be reduced and thus the safety can be improved.

According to the embodiments, the resin function which is excellent in impregnation property of the electrolytic solution can be obtained without impairing the ionic conductivity.

Additional features and advantages are described herein, and will be apparent from the following Detailed Description and the figures.

DETAILED DESCRIPTION

Figure 1:
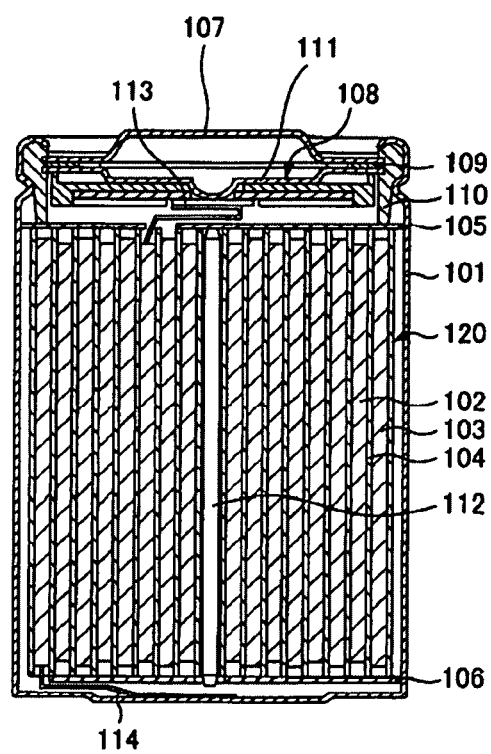
FIG. 1 is a cross-sectional view showing a structure of the battery according to a first embodiment.

Hereinafter, the first embodiment will be described with reference to the accompanying drawings. FIG. 1 shows a cross-sectional structure of a nonaqueous electrolyte battery according to the first embodiment.

The nonaqueous electrolyte battery is the so-called cylindrical shape and includes a spiral electrode body 120 in which a band-like cathode 102 and a band-like anode 103 are wound via a separator 104 in an almost hollow cylinder-like battery can 101.

The battery can 101 is made of, for example, iron Fe plated with nickel Ni and one end thereof is closed, and the other end is opened. In the battery can 101, a pair of insulating plates 105 and 106 are arranged to sandwich the spiral electrode body 120 perpendicularly to a spiral periphery surface thereof.

A battery lid 107, and a safety valve mechanism 108 and a positive temperature coefficient (PTC) element 109 which are positioned inside the battery lid 107, are mounted in the open end of the battery can 101 by caulking via a gasket 110 to seal the inside of the battery can 101. The battery lid 107 is made of, for example, the same material as the battery can 101. The safety valve mechanism 108 is electrically connected to the battery lid 107 through the PTC element 109. When an internal pressure of the battery becomes more than a certain value due to the internal short circuit or heating from outside, a disk plate 111 is inverted to cut the electric connection between the battery lid 107 and the spiral electrode body 120. The PTC element 109 restricts electric currents, when its resistance value increases with an increase in temperature, to prevent unusual heat generation due to high electric currents. The gasket 110 is made of, for example, an insulating material and asphalt is applied to the surface thereof.

The spiral electrode body 120 is wound around, for example, a center pin 112. A cathode lead 113 containing aluminum Al or the like is connected to the cathode 102 of the spiral electrode body 120, and an anode lead 114 containing nickel Ni or the like is connected to the anode 103. The cathode lead 113 is welded to the safety valve mechanism 108 to be electrically connected with the battery lid 107. The anode lead 114 is welded to the battery can 101 to be electrically connected.

[Cathode]

Figure 2:
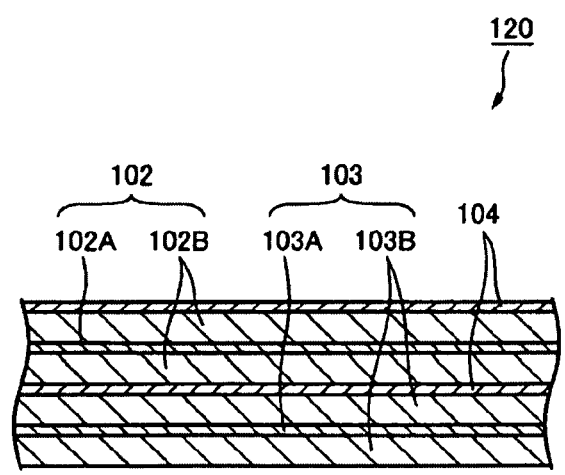
FIG. 2 is a partly enlarged cross-sectional view shoving the spiral electrode body in the battery shown in FIG. 1.

FIG. 2 is a partly enlarged cross-sectional view showing the spiral electrode body 120 shown in FIG. 1. As shown in FIG. 2, the cathode 102 has a structure, for example, where a cathode current collector 102A has a pair of opposed surfaces and a cathode mixture layer 102B is located on both sides of the cathode current collector 102A. In addition, the cathode 102 may have an area in which the cathode mixture layer 102B is located only on one side of the cathode current collector 102A. The cathode current collector 102A is made of, for example, a metallic foil such as aluminum Al foil. The cathode mixture layer 102B contains, for example, a cathode active material and further may contain a conductive agent such as graphite and a binder such as polyvinylidene fluoride, if necessary.

As the cathode active material, a cathode material capable of occluding and releasing lithium can be used. Specific examples of the cathode material include lithium containing compounds such as lithium oxide, lithium phosphorus oxide, lithium sulfide and an intercalation compound containing lithium. Two or more of them may be used in combination. In order to obtain a high energy density, it is preferable to use lithium containing compounds which include lithium Li, transition metal element, and oxygen O. Among them, the lithium containing compound which includes at least one selected from the group consisting of cobalt Co, nickel Ni, manganese Mn, and iron Fe as transition metal element is more preferable.

Examples of the lithium containing compound include lithium composite oxides having an average composition represented by Chemical Formula I, more specifically Chemical Formula II and lithium composite oxides having an average composition represented by Chemical Formula III.

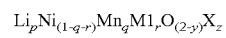   (Chemical Formula I)

$Li_p Ni_{(1-q-r)} Mn_q M1_r O_{(2-y)} X_z$   (Chemical Formula I)

(wherein M1 represents at least one selected from the group consisting of elements of Groups 2 to 15 except for nickel Ni and manganese Mn. X represents at least one selected from the group consisting of elements of Group 16 and Group 17 except for oxygen O. Values of p, q, v, and z are in the range of $0 \leq p \leq 1.5$, $0 \leq q \leq 1.0$, $0 \leq r \leq 1.0$, $-0.10 \leq y \leq 0.20$, and $0 \leq z \leq 0.2$.)

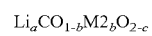

$Li_a CO_{1-b} M2_b O_{2-c}$   (Chemical Formula II)

(wherein, M2 represents at least one selected from the group consisting of vanadium V, copper Cu, zirconium Zr, zinc Zn, magnesium Mg, aluminum Al, gallium Ga, yttrium Y, and iron Fe. Values of a, b, and c are in the range of $0.9 \leq a \leq 1.1$, $0 \leq b \leq 0.3$, and $-0.1 \leq c \leq 0.1$. The composition of lithium changes depending on the charge-discharge state. In addition, the value of a represents a value in full discharged state.)

$$Li_wNi_xCo_yMn_zM3_{1-z-y-z}O_{2-v}$$ (Chemical Formula III)

(wherein, M3 represents at least one selected from the group consisting of vanadium V, copper Cu, zirconium Zr, zinc Zn, magnesium Mg, aluminum Al, gallium Ga, yttrium Y, and iron Fe. Values of v, w, x, y, and z are in the range of $-0.1 \leq v \leq 0.1$, $0.9 \leq w \leq 1.1$, $0 < x < 1$, $0 < v < 1$, $0 < z < 0.5$, and $0 \leq 1-x-y-z$. The composition of lithium changes depending on the charge-discharge state. In addition, the value of w represents a value in full discharged state.)

Further, examples of the lithium containing compound include lithium composite oxide having a spinel-type structure represented by Chemical Formula IV. More specifically, the example includes $Li_dMn_2O_4$ (d≈1), and the like.

$$Li_pMn_{2-p}M4_qO_rF_s$$ (Chemical Formula IV)

(wherein, M4 represents at least one selected from the group consisting of cobalt Co, nickel Ni, magnesium Mg, aluminum Al, boron B, titanium Ti, vanadium V, chromiun Cr, iron Fe, copper Cu, zinc Zn, molybdenum Mo, tin Sn, calcium Ca, strontium Sr, aid twigsten W. Values of p, q, r, and s are in the range of $0.9 \leq p \leq 1.1$, $0 \leq q \leq 0.6$, $3.7 \leq r \leq 4.1$, and $0 \leq s \leq 0.1$. In addition, the composition of lithium changes depending on the charge-discharge state. The value of p represents a value in full discharged state.)

Further, examples of the lithium containing compound include lithium composite phosphate having an olivine-type structure represented by Chemical Formula V, more specifically Chemical Formula VI. More specifically, the example includes $LieF_ePO_4$ (e≈1).

$$Li_aM5_bPO_4$$ (Chemical Formula V)

(wherein, M5 represents at least one selected from the group consisting of elements of Groups 2 to 15. Values of a and b are in the range of $0 \leq a \leq 2.0$ and $0.5 \leq b \leq 2.0$.)

$$Li_tM6PO_4$$ (Chemical Formula VI)

(wherein, M6 represents at least one selected from the group consisting of cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr. A value of t is in the range of $0.9 \leq t \leq 1.1$. The composition of lithium changes depending on the charge-discharge state. The value of t represents a value in full discharged state.)

In addition to the above-described cathode materials, examples of the cathode material capable of occluding and releasing lithium Li include inorganic compounds not containing lithium such as $MnO_2$, $V_2O_5$, $V_6O_{13}$, NiS, and MoS.

[Anode]

The anode 103 has a structure, for example, where an anode mixture layer 103B is provided on both sides of an anode current collector 103A which has a pair of opposed surfaces. The anode mixture layer 103B may be provided only on one side of the anode current collector 103A, which is not illustrated. The anode current collector 103A is made of, for example, a metallic foil such as copper foil.

The anode mixture layer 103B is made including any one, or two or more of the anode material capable of occluding and releasing lithium as an anode active material and may be also made including the same binder as the anode mixture layer 102B, if necessary.

In addition, in the nonaqueous electrolyte battery, the electrochemical equivalent of the anode material capable of occluding and releasing lithium is larger than the electrochemical equivalent of the cathode 121. Thus, lithium metal is not precipitated on the anode 103 during the charge.

Further, the nonaqueous electrolyte battery is designed so that an open circuit voltage (namely, battery voltage) in the full charge state is within, for example, a range of 4.2 V to 4.6 V. For example, in the case where the open circuit voltage in the full charge state is 4.25 V or more, the discharge of lithium per unit mass is increased more than that of the battery of 4.2V even if the same cathode active material is used. Depending on the case, the amount of the cathode active material and the anode active material is adjusted, thereby obtaining a high energy density.

Examples of the anode material capable of occluding and releasing lithium include carbon materials such as graphite, non-easy-graphitizable carbon, easy-graphitizable carbon, pyrolytic carbons, cokes, glassy carbons, organic polymer compound firing products, carbon fiber or activated carbon. Examples of such a coke include pitch coke, needle coke, or petroleum coke. Organic polymer compound firing products are obtained by firing and carbonizing polymeric materials such as a phenol resin and a furan resin at suitable temperatures. Some of them are categorized as non-easy-graphitizable carbon or easy-graphitizable carbon. Examples of the polymeric material include polyacethylene or polypyrrole. These carbon materials are desirable because there is very little change of the crystal structure thereof produced in charge and discharge and a high charge-discharge capacity and an excellent cycle characteristics can be obtained. Particularly, graphite is preferable since a large electrochemical equivalent and a high energy density can be obtained. Further, non-easy-graphitizable carbon is preferable since an excellent characteristic can be obtained. Furthermore, a carbon material having a low charge-discharge potential, specifically, a carbon material having a charge-discharge potential close to that of lithium metal are preferable because a high energy density of the battery is easily realized.

Examples of the anode material capable of occluding and releasing lithium include materials capable of occluding and releasing lithium which contain at least one of metal elements and metalloid elements as a constituting element. The use of such a material allows for obtaining a high energy density. When they are used in combination with, particularly, carbon materials a high energy density and excellent cycle characteristics can be obtained, which is more preferable. Examples of the anode material may include the simple substance, alloy, and compound of the metal element or the metalloid element, or materials having the phases of one, or two ore more such materials in at least one part thereof. In the present embodiments, an alloy including one or more metallic elements and one or more metalloid elements is included in addition to an alloy including two or more metallic elements. Additionally, a nonmetallic element may be included. Examples of the structures of the materials include a solid solution, an eutectic (eutectic mixture), an intermetallic compound or a concomitant state of two or more of the structures.

Examples of a metal element constituting the anode material or a metalloid element include magnesium Mg, boron B, aluminium Al, gallium Ga, Indium In, silicon Si, germanium Ge, tin Sn, lead Pb, bismuth Bi, cadmium Cd, silver Ag, zinc Zn, hafnium Hf, zirconium Zr, yttrium Y, palladium Pd, or platinum Pt. These elements may be a crystalline substance or amorphous.

Among them, preferable examples of the anode material include materials which contain metal elements or metalloid elements of Group 4B of the short period periodic table as the constituent element. The materials which contain at least one of silicon Si and tin Sn as the constituent element are particularly preferable. This is because silicon Si and tin Sn have a large ability to occlude and release lithium Li and a high energy density can be obtained.

Examples of the alloy of tin Sn include alloys containing at least one among the group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than tin Sn. Examples of the alloy of silicon Si include alloys containing at least one among the group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than silicon Si.

As a compound of tin Sn or a compound of silicon Si, for example, a compound containing oxygen O or carbon C is listed. In addition to tin Sn or silicon Si, the second constituting element described above may be contained.

Examples of the anode material capable of occluding and releasing lithium further include other metallic compounds or polymeric materials. Examples of other metallic compounds include oxides such as $MnO_2$, $V_2O_5$, and $V_6O_{13}$; sulfides such as NiS and MoS; or lithium nitrides such as $LiN_3$. Examples of the polymeric material include polyacethylene, polyaniline or polypyrrole.

[Electrolytic Solution]

A nonaqueous electrolytic solution obtained by dissolving an electrolyte salt in a nonaqueous solvent can be used as an electrolytic solution. It is preferable that the nonaqueous solvent contains at least either ethylene carbonate or propylene carbonate. This is because the cycle characteristics can be improved. Particularly, when ethylene carbonate and propylene carbonate are mixed and contained, the cycle characteristics can be further improved, which is preferable. It is preferable that the nonaqueous solvent contains at least one of chain carbonate esters such as diethyl carbonate, dimethyl carbonate, ethyl methyl carbonate, or methyl propyl carbonate. This is because the cycle characteristics can be further improved.

It is preferable that the nonaqueous solvent further contains at least either 2,4-difluoroanisole or vinylene carbonate. This is because 2,4-difluoroanisole can improve the discharging capacity and vinylene carbonate can further improve the cycle characteristics. Particularly, when these material are mixed and contained, both the discharging capacity and cycle characteristics can be improved, which is more preferable.

The nonaqueous solvent further may include any one, or two or more of butylene carbonate, γ-butyrolactone, γ-valerolactone, solvents in which a part or all of hydrogen groups of these compounds are substituted by a fluorine group, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxy propionitrile, N,N-dimethyl formamide, N-methylpyrrolizinone, N-melhyloxazolidinone, N,N-dimethyl imidazolidinone, nitromethane, nitroethane, sulfolane, dimethyl sulfoxide, or trimethyl phosphate.

Depending on the combination of the electrode, the reversibility of electrode reaction may be improved by using the solvent in which a part or all of hydrogen atoms of the substance contained in the above-described nonaqueous solvent group are substituted by a fluorine atom. Therefore, these substances can be conveniently used.

Suitable examples of the lithium salt which is an electrolyte salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2$ (ox) [lithium difluoro oxalate borate], LiBOB [lithium bisoxalate borate] or LiBr. The lithium salts may be used alone or two or more of them may be used in combination. Among them, LiPF6 is preferable because a high ion-conductivity can be obtained and cycle characteristics can be improved.

[Separator]

The separator 104 separates the cathode 102 from the anode 103 and allows lithium ion to be passed while the short circuit of the electric current due to the contact of the cathode and the anode is prevented.

Figure 3A:
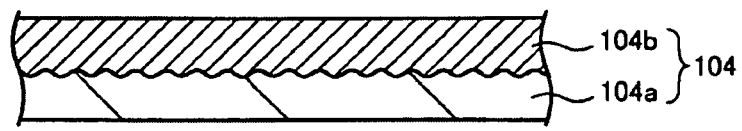
FIG. 3A, FIG. 3B and FIG. 3C are schematic diagrams showing an example of the separator of the battery according to the first embodiment.

As shown in FIG. 3A, the separator 104 has, for example, an exposed layer 104a in which a fine porous polyolefin resin is exposed and a covering layer 104b in which a fine framework of the fine porous polyolefin resin is coated with a layer 104d of glass (hereinafter referred to as a glass layer 104d). Here, the term "glass" means the glass which has the $SiO_4$ tetrahedral structure phase of the SiO bond. Further, examples of the polyolefin resin include polyethylene (PE) and polypropylene (PP).

Figure 3B:
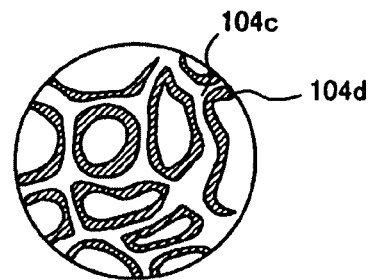
Figure 3C:
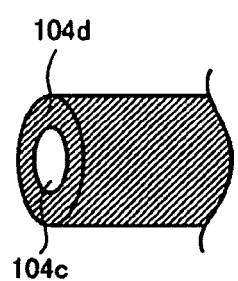

FIG. 3B is a view in which the covering layer 104b is enlarged and shows typically the structure of the covering layer 104b. FIG. 3C typically shows a cross section in which a fine framework 104c is coated with the glass layer 104d. As shown in FIG. 3B, in the covering layer 104b, the fine framework 104c of polyolefin resin is coated with the glass layer 104d. As shown in FIG. 3C, the fine framework 104c is completely coated with the glass layer 104d. Further, in the case where there is a dense portion in which the fine framework 104c is present very densely, a lump of the fine framework 104c which constitutes the dense portion may be coated with the glass layer 104d. From the point of view of the flexibility and heat resistance of the separator 104, the thickness of the glass layer 104d is preferably 0.3 μm to 2 μm.

Since the fine framework 104c of polyolefin resin is coated with the glass layer 104d, the separator 104 is excellent in the effect of preventing the heat shrinkage and the safety of the battery can be improved. As compared with the separator in related art which has the structure in which glass is simply stacked on the surface of polyolefin resin, the separator 104 is excellent in heat resistance even if it is thin, and thus the safety of the battery can be improved. The present disclosure is different from the separator in which glass is mixed with polyolefin resin. Since the fine framework 104c of polyolefin resin is coated with the glass layer 104d in the present embodiment, heat-resistant effect can be obtained without inhibiting the ionic conductivity. Therefore, the safety of the battery can be improved.

The covering layer 104b is formed by reacting with a moisture curing type coating agent which contains polysilazane compound having a repeating unit which is represented by Chemical Formula 1 as a main component. Specifically, among the polysilazane compounds, the viscous liquid product which contains only polysilazane compound having a liquid property without solvent or the mixture of viscous liquid product which contains only the polysilazane compound with polycarbosilazane compound having a repeating unit which is represented by Chemical Formula 2 is applied to the polyolefin resin as a precursor, which is then placed in a water bath. Thereafter, the resulting product is dried by hot air and the covering layer can be formed. Here, the term "viscous liquid product" means that it can be applied on the polyolefin resin of a base material and has a form retaining capability can retain the form on the base material without flowing.

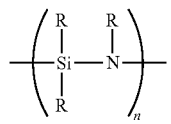

[Chemical Formula 1]

(Rs independently represent organic side chains such as hydrogen and alkyl group.

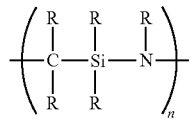

[Chemical Formula 2]

(Rs independently represent organic side chains such as hydrogen and alkyl group.)

In the Production Method, the Viscous Liquid Product which Contains only polysilazane compound can be applied to the polyolefin resin as a precursor without solvent and thus a complicated process accompanied by drying the solvent can be simplified and the product tact time can be shortened. Further, the polysilazane compound to be used as a raw material may contain an organic side chain as a side chain. After the curing by humidity, a residual product of the organic side chain may include accessory components other than glass.

It is preferable that the separator 104 has an area heat shrinkage ratio of 60% or less at 200° C.

It is preferable that the thrust strength of the separator 104 is in the range of 100 gf to 1000 gf. This is because a short-circuit may be generated when the thrust strength is low and the ionic conductivity is decreased when the thrust strength is high.

It is preferable that the air permeability of the separator 104 is in the range of 30 sec/100 cc to 1000 sec/100 cc. This is because a short-circuit may be generated when the air permeability is low and the ionic conductivity is decreased when the air permeability is high.

Next, the method for manufacturing the nonaqueous electrolyte batter according to the first embodiment will be described. Hereinafter, the method for manufacturing the nonaqueous electrolyte battery will be described with reference to an example of a nonaqueous electrolyte battery with a cylindrical shape.

The cathode 102 is fabricated as described below. First, the cathode active material, conductive agent, and binding agent are mixed to prepare a cathode mixture and then the cathode mixture is dispersed in a solvent such as N-methyl-2-pyrrolidone to give a cathode mixture slurry.

Next, the cathode mixture slurry is applied to the cathode current collector 102A and the solvent is dried, followed by compression molding with a roll presser to form the cathode mixture layer 102B. Then, the cathode 102 is fabricated.

The anode 103 is fabricated as described below. First, the anode active material and the binding agent are mixed to prepare an anode mixture and then the anode mixture is dispersed in a solvent such as N-methyl-2-pyrrolidone to give an anode mixture slurry.

Next, the anode mixture slurry is applied to the anode current collector 103A and the solvent is dried, followed by compression molding with a roll presser to form the anode mixture layer 103B. Then, the anode 103 is fabricated.

Next, the cathode lead 113 is fixed to the cathode current collector 102A with welding or the like, and the anode lead 114 is fixed to the anode current collector 103A with welding or the like. Thereafter, the cathode 102 and the anode 103 are wound sandwiching the separator 104 therebetween, a tip portion of the cathode lead 113 is welded to the safety valve mechanism 108, a tip portion of the anode lead 114 is welded to the battery can 101, and the wound cathode 102 and anode 103 are sandwiched between a pair of the insulating plates 105 and 106, and then housed inside the battery can 101. Since the method for manufacturing the separator 104 has been described, a detailed description will not be repeated here.

Subsequently, the electrolytic solution is injected into the batter %, can 101 so as to be impregnated into the separator 104. Then, the battery lid 107, the safety valve mechanism 108, and the PTC element 109 are caulked and fixed to an opening end of the battery can 101 through the gasket 110. As described above, the nonaqueous electrolyte battery according to the first embodiment is fabricated.

When the nonaqueous electrolyte battery according to the first embodiment is charged, a lithium ion is withdrawn from, for example, the cathode 102 and occluded into the anode 103 via the electrolytic solution. On the other hand, when the nonaqueous electrolyte battery is discharged, a lithium ion is withdrawn from, for example, the anode 103 and occluded into the cathode 102 via the electrolytic solution.

In the separator 104 to be used for the nonaqueous electrolyte battery according to the first embodiment, the heat shrinkage ratio under a high temperature atmosphere can be reduced by the covering layer 104b which has shutdown function of the exposed layer 104a in which the polyolefin resin is exposed and the fine framework 104c of polyolefin resin is coated with the glass layer 104d without inhibiting the ionic conductivity and defects caused by the heat shrinkage can be prevented.

In the first embodiment, the nonaqueous electrolyte battery produced by using the separator 104 having the exposed layer 104a and the covering layer 104b has been described. The nonaqueous electrolyte battery may include one or more of each of the exposed layer 104a and the covering layer 104b.

Figure 4:
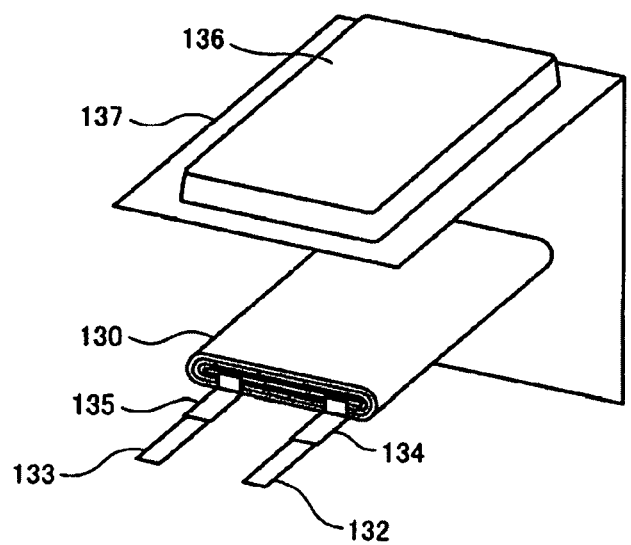
FIG. 4 is a cross-sectional view showing a structure of the battery according to a second embodiment.

FIG. 4 shows the structure of the nonaqueous electrolyte battery according to the second embodiment. As shown in FIG. 4, the nonaqueous electrolyte battery is fabricated by placing a battery element 130 in an exterior member 137 made of a moisture-proof laminate film and sealing the circumference of the battery element 130 by welding. The battery element 130 has a cathode lead 132 and an anode lead 133 and these leads are inserted into the exterior member 137 and pulled to the outside. The both sides of the cathode lead 132 and the anode lead 133 are coated with a resin section 134 and a resin section 135 in order to improve adhesion to the exterior member 137.

[Exterior Member]

The exterior member 137 has a laminated structure in which, for example, an adhesion layer, a metal layer, and a surface protection layer are sequentially laminated. The adhesion layer is made of a polymeric film. Examples of the material which constitutes the polymeric film include polypropylene (PP), polyethylene (PE), non-drawn polypropylene (CPP), linear low density polyethylene (LLDPE), and low density polyethylene (LDPE). The metal layer is made of a metallic foil. Examples of the material which constitutes the metallic foil include aluminium Al. Further, metals other than aluminium can also be used as the material which constitutes the metallic foil. Examples of the material which constitutes the surface protection layer include nylon Ny and polyethylene terephthalate (PET). In this regard, the surface of the side of the adhesion layer is a storage surface of the side which houses a battery element 30.

[Battery Element]

Figure 5:
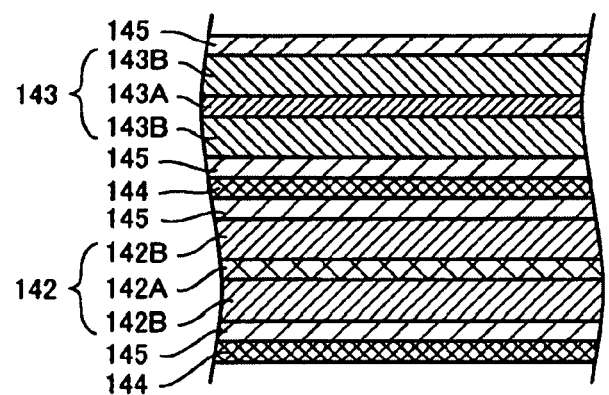
FIG. 5 is a cross-sectional view of a battery element shown in FIG. 4.

For example, as shown in FIG. 5, the battery element 130 is a spiral battery element 130 which is formed by stacking a band-like anode 143 in which a gel electrolyte layer 145 is formed on both sides, a separator 144, a band-like cathode 142 in which the gel electrolyte layer 145 is formed on both sides, and the separator 144 and winding in a longitudinal direction. In this regard, the structure of the separator 144 is the same as the first embodiment, a detailed description will not be repeated here.

The cathode 142 includes the band-like cathode current collector 142A and a cathode mixture layer 142B which is formed on both sides of the cathode current collector 142A. The cathode current collector 142A is made of a metallic foil such as aluminum Al.

The cathode lead 132 which is connected by, for example, spot welding or ultrasonic welding is provided at one end in a longitudinal direction of the cathode 142. Examples of the material of the cathode lead 132 to be used herein include metals such as aluminium.

The anode 143 includes the band-like anode current collector 143A and an anode mixture layer 143B which is formed on both sides of the anode current collector 143A. The anode current collector 143A is made of metal foil such as copper Cu foil, nickel foil, or stainless steel foil.

As with the cathode 142, the anode lead 133 which is connected by, for example, spot welding or ultrasonic welding is also provided at one end in a longitudinal direction of the anode 143. Examples of the material of the anode lead 133 to be used herein include copper Cu, nickel Ni and the like.

Since the embodiment other than the gel electrolyte layer 145 is the same as that of the first embodiment, the gel electrolyte layer 145 will be described hereinbelow.

The gel electrolyte layer 145 contains an electrolytic solution and a polymeric compound which is used as a support of the electrolytic solution and is a so-called gel layer. The gel electrolyte layer 145 is preferable because a high ionic conductivity can be obtained and liquid leakage of a battery can be prevented. The structure of the electrolytic solution (namely, a liquid solvent, an electrolyte salt, and an additive agent) is the same as that of the first embodiment.

Examples of a polymeric compound include polyacrylonitrile, polyvinylidene fluoride, copolymers of vinylidene fluoride and hexafluoro propylene, polytetrafluoroethylene, polyhexafluoro propylene, polyethylene oxide, polypropylene oxide, polyphosphazen, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. Particularly, from a viewpoint of electrochemical stability, it is preferable to use polyacrylonitrile, polyvinylidene fluoride, polyhexafluoropropylene, or polyethylene oxide.

Next, the method for manufacturing the nonaqueous electrolyte battery according to the second embodiment is described. First, a precursor solution containing a solvent, an electrolyte salt, a polymeric compound, and a mixed solvent is applied to the cathode 142 and the anode 143, respectively and then the mixed solvent is volatilized in order to form the gel electrolyte layer 145. In this regard, the cathode lead 132 is previously mounted on the end of the cathode current collector 142A by welding and the anode lead 133 is mounted on the end of the anode current collector 143A by welding.

Next, the cathode 142 and the anode 143 in which the gel electrolyte layer 145 is formed are laminated via the separator 144 to form a layered product. Then, the layered product is wound in a longitudinal direction thereof to form the spiral battery element 130. Since the method for manufacturing the separator 104 has been described, a detailed description will not be repeated here.

Next, the exterior member 137 made of a laminate film is subjected to the deep drawing process to form a concave portion 136 and the battery element 130 is inserted into the concave portion 136. Then, an unprocessed portion of the exterior member 137 is folded on the upper portion of the concave portion 136 and the peripheral portion of the concave portion 136 is sealed by heat welding. As described above, the nonaqueous electrolyte battery according to the second embodiment is fabricated. In the second embodiment, the same effect as that of the first embodiment can be obtained.

EXAMPLES

Specific examples will be described with reference to FIGS. 1 to 3C. However, the embodiments are not to be construed as being limited to these examples.

Example 1

A viscous liquid product which contained only polysilazane compound as a precursor was applied onto a polyethylene fine porous membrane 16 μm thick by using a desktop coater, which was then placed in a water bath. Thereafter, the resulting product was dried by hot air so as to form the separator 104 having the exposed layer 104a made of polyethylene and the covering layer 104b in which the fine framework 104c of the polyethylene fine porous membrane is coated with the glass layer 104d. Further, the thickness of the glass layer 104d was measured with a thickness gage and it was 2 μm. In this regard, "thickness of polyethylene fine porous membrane" and "thickness of the separator 104 having the exposed layer 104a and the covering layer 104b" were measured with the thickness gage. Substituting these values into the following equation yielded the thickness of the glass layer 104d.

("thickness of the glass layer 104d")=("thickness of the separator 104 having the exposed layer 104a and the covering layer 104b")−("thickness of polyethylene fine porous membrane")   (Equation)

As described below, a cylinder-type battery (a size of 18650) was fabricated by using the obtained separator 104.

98 parts by mass of lithium cobalt oxide, 1.2 parts by mass of polyvinylidene fluoride, 0.8 part by mass of carbon black were dispersed in N-methyl-2-pyrrolidone solvent to obtain an cathode mixture slurry. The cathode mixture slurry was applied to the both sides of the aluminum foil 15 μm thick of the cathode current collector 102A, which was dried. Then, the resulting product was pressed to form the cathode mixture layer 102B and the cathode 102 was obtained.

Further, 90 parts by mass of artificial graphite and 10 parts by mass of polyvinylidene fluoride were dispersed in N-methyl-2-pyrrolidone solvent to obtain an anode mixture slurry. The anode mixture slurry was applied to the both sides of the copper foil 15 μm thick of the anode current collector 103A, which was dried. Then, the resulting product was pressed to form the anode mixture layer 103B and the anode 103 was obtained.

Next, the cathode lead 113 was fixed to the cathode current collector 102A with welding or the like, and the anode lead 114 was fixed to the anode current collector 103A with welding. Thereafter, the cathode 102 and the anode 103 were wound sandwiching the separator 104 therebetween, a tip portion of the cathode lead 113 was welded to the safety valve mechanism 108, a tip portion of the anode lead 114 was welded to the battery can 101, and the wound cathode 102 and anode 103 were sandwiched between a pair of the insulating plates 105 and 106, and then housed inside the battery can 101. After housing the cathode 102 and anode 103 inside the battery can 101, the electrolytic solution was injected into the battery can 101 so as to be impregnated into the separator 104.

Here, $LiPF_6$ was dissolved in a mixed solvent obtained by mixing ethylene carbonate (EC) and propylene carbonate (PC) at the same volume ratio so as to be 1 mol/l, which was used as the electrolytic solution.

Thereafter, the battery lid 107, the safety valve mechanism 108, and the PTC element 109 were caulked and fixed to an opening end of the battery can 101 through the gasket 110. As described above, a cylinder-type battery (a size of 18650) of Example 1 was obtained.

Example 2

A battery of Example 2 was fabricated in the same manner as described in Example 1 except that the amount of viscous liquid product which contained only polysilazane compound as a precursor was adjusted so that the thickness of the glass layer 104d was 0.5 μm in producing the separator 104.

Example 3

A battery of Example 3 was fabricated in the same manner as described in Example 1 except that the amount of viscous liquid product which contained only polysilazane compound as a precursor was adjusted so that the thickness of the glass layer 104d was 0.3 μm in producing the separator 104.

Comparison 1

A battery of Comparison 1 was fabricated in the same manner as described in Example 1 except that a polyethylene fine porous membrane was directly used as the separator 104.

Comparison 2

A battery of Comparison 2 was fabricated in the same manner as described in Example 1 except that the amount of viscous liquid product which contained only polysilazane compound as a precursor was adjusted so that the thickness of the glass layer 104d was 4 μm in producing the separator 104.

Comparison 3

A battery of Comparison 3 was fabricated in the same manner as described in Example 1 except that the amount of viscous liquid product which contained only polysilazane compound as a precursor was adjusted so that the thickness of the glass layer 104d was 0.2 μm in producing the separator 104.

Comparison 4

The viscous liquid product which contained only polysilazane compound as a precursor was applied onto a polypropylene film by using a desktop coater in the same manner as described in Example 1, which was then placed in a water bath. Thereafter, the resulting product was dried by hot air to form a glass layer. Here, the thickness of glass layer was measured with the thickness gage and the thickness of the glass layer was 2 μm. Thereafter, the glass layer was peeled off from the surface of the polypropylene film, which was stacked with the polyethylene fine porous membrane to form the separator 104. A battery of Comparison 4 was fabricated in the same manner as Example 1 except the above-mentioned point.

The area contraction ratio of the separator 104 used for the batteries of Examples 1 to 3 and Comparisons 1 to 4 was measured. Further, the batteries of Examples 1 to 3 and Comparisons 1 to 4 were subjected to a high temperature storage test and it was checked whether the gas was blown. The measurement of area contraction ratio and the high temperature storage test were performed as described below.

(Measurement of Area Contraction Ratio)

First, the separator 104 was cut out in a longitudinal direction ((MD)×width direction (TD)=5 cm×5 cm) and two-points were marked at 4 cm intervals along each center. Next, the separator 104 which was placed on a Teflon plate without being fixed was placed in a thermostat heated at 200° C. in advance. After 20 minutes, it was taken out and then the intervals of each of MD and TD which were marked in advance were measured with a vernier caliper. The area contraction ratio was calculated using the following Equation.

Area contraction ratio (%)=100−{[("two-point interval of MD after heat treatment"×"two-point interval of TD after heat treatment")/("two-point interval of MD before heat treatment (4 cm)"× "two-point interval of TD (4 cm) before heat treatment")]×100}  (Equation)

(High Temperature Storage Test)

A battery was charged so that the open circuit voltage in the full charge state was 4.2 V. Then, the battery was left in a thermostat at 140° C. for 1 hour and it was checked whether the gas was blown within 1 hour.

The measured results and test results are shown in Table 1.

TABLE 1

| | EXPOSED LAYER | COVERING LAYER | MANUFACTURING METHOD | THICKNESS OF GLASS LAYER (μm) | AREA CONTRACTION RATIO OF SEPARATOR (%) | HIGH TEMPERATURE STORAGE TEST (AT 140° C. FOR 1 hr) |
|---|---|---|---|---|---|---|
| EXAMPLE 1 | PE | GLASS LAYER + PE | COATING | 2 | 11 | NO BLOW OF GAS |
| EXAMPLE 2 | PE | GLASS LAYER + PE | COATING | 0.5 | 45 | NO BLOW OF GAS |
| EXAMPLE 3 | PE | GLASS LAYER + PE | COATING | 0.3 | 53 | NO BLOW OF GAS |
| COMPARISON 1 | PE | NONE | — | — | 100 | BLOW OF GAS |
| COMPARISON 2 | PE | GLASS LAYER + PE | COATING | 4 | 6 | DIFFICULTY IN WINDING BATTERY |
| COMPARISON 3 | PE | GLASS LAYER + PE | COATING | 0.2 | 65 | BLOW OF GAS |
| COMPARISON 4 | PE | NONE | STACKING OF GLASS LAYER | 2 | 95 | BLOW OF GAS |

PE: POLYETHYLENE

As shown in Table 1, the area contraction ratios of Examples 1 to 3 were lower than those of Comparison 1, 3, and 4. In the high temperature storage test which was performed at 140° C. for 1 hour, the gas was not blown and thus it was found that the safety of the battery can be improved.

In the case of Comparison 1, the gas was blown in the high temperature storage test under the conditions of 140° C. and 1 hour because only polyethylene fine porous membrane was used as the separator 104. In the case of Comparison 2, since the thickness of the glass layer 104d was too thick, it lacked flexibility. As a result, the membrane of the separator 104 was destroyed at the time of winding. In the case of Comparison 3, the heat shrinkage could not be prevented because the thickness of the glass layer 104d was thin. As a result, the gas was blown. In the case of Comparison 4, the heat shrinkage of polyethylene fine porous membrane could not be prevented because the glass layer was simply stacked on the surface of polyethylene fine porous membrane. As a result, the gas was blown.

It should be understood by those skilled in the art that various modifications, combinations, sub-combinations and alterations may occur depending on design requirements and other factors insofar as they are within the scope of the appended claims or the equivalents thereof. The example in which the fine framework 104c of the polyolefin resin is coated with the glass layer 104d by applying the viscous liquid product which contains only polysilazane compound on one side of the polyolefin resin has been described in the embodiments and Examples. For example, the fine framework 104c may be coated with the glass layer 104d by applying the viscous liquid product which contains only polysilazane compound to both sides of the polyolefin resin. Further, the exposed layer 104a and the covering layer 104b may be integrated after manufacturing them respectively. The covering layer 104b may be formed on one side of the surface by applying the precursor to one side of the surface of a single layer polyolefin resin not so as to reach another side of the surface and impregnating it. In such a case, a portion in which only a part of the surface of the polyolefin resin framework is coated with the glass layer 104d may be present between the exposed layer 104a and the covering layer 104b. Further, the separator 104 may be a single layer separator having only the covering layer 104b. In such a single layer separator, the fine framework 104c is coated with the glass layer 104d and thus the polyolefin resin is protected by the glass layer 104d without making the thickness of the separator thicker by stacking the glass layer. Therefore, the damage of the separator 104 and the short-circuit due to shrinkage can be avoided.

The embodiments have been described with reference to the lithium-ion secondary battery as example. The present embodiments can be applied to, for example, a nickel-hydrogen battery, a nickel cadmium battery, a lithium-manganese dioxide battery, and a lithium-iron sulfide battery.

In the embodiments and Examples, a so-called lithium ion secondary battery in which the capacity of the anode is represented by a capacity component determined by occlusion and release of lithium has been described. The embodiments can be similarly applied to a so-called lithium metal secondary battery in which lithium metal is used for the anode active material and the capacity of the anode is represented by a capacity component determined by precipitation and release of lithium or a secondary battery in which the capacity of the anode is represented by the sum of the capacity component determined by occlusion and release of lithium and the capacity component determined by precipitation and release of lithium by lowering the charging capacity of the anode material capable of occluding and releasing lithium than the charging capacity of the cathode.

Further, the nonaqueous electrolyte secondary, battery having a winding structure has been described in the embodiments and Examples. The present embodiments can be similarly applied to a battery having a structure in which the cathode and the anode are folded or stacked. In addition, the present embodiments can be applied to the so-called coin type battery, button type battery, square type battery, and the like. Further, the present embodiments can be applied to not only the secondary batteries but also primary batteries.

Figure 6:
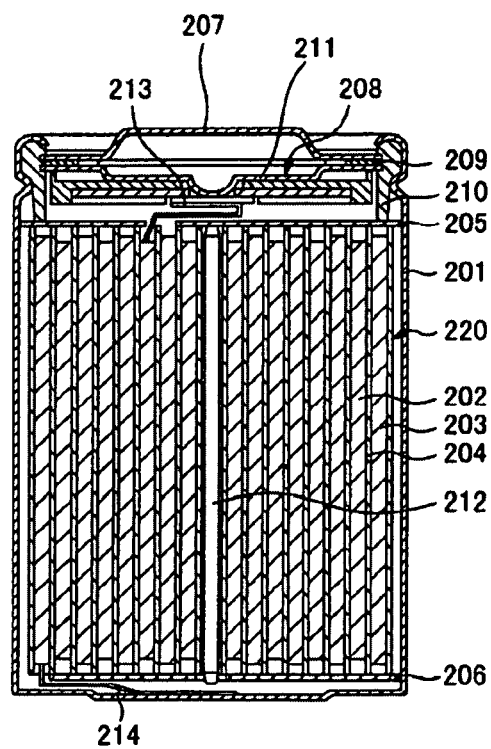
FIG. 6 is a cross-sectional view showing a structure of the battery according to a third embodiment.

The third embodiment will be described with reference to the accompanying drawings. FIG. 6 shows the cross section structure of the nonaqueous electrolyte battery according to the third embodiment.

The nonaqueous electrolyte battery is the so-called cylindrical shape and includes a spiral electrode body 220 in which a band-like cathode 202 and a band-like anode 203 are wound via a separator 204 in a almost hollow cylinder-like battery can 201.

The battery can 201 is made of, for example, iron Fe plated with nickel Ni and one end thereof is closed, and the other end is opened. In the battery can 201, a pair of insulating plates 205 and 206 are arranged to sandwich the spiral electrode body 220 perpendicularly to a spiral periphery surface thereof.

A battery lid 207, and a safety valve mechanism 208 and a positive temperature coefficient (PTC) element 209 which are positioned inside the battery lid 207, are mounted in the open end of the battery can 201 by caulking via a gasket 210 to seal the inside of the battery can 201. The battery lid 207 is made of the same material as, for example, the battery can 201. The safety valve mechanism 208 is electrically connected to the battery lid 207 through the PTC element 209. When an internal pressure of the battery becomes more than certain value due to internal short circuit or heating from outside, a disk plate 211 is inverted to cut the electric connection between the battery lid 207 and the spiral electrode body 220. The PTC element 209 restricts electric currents, when its resistance value increases with an increase in temperature, to prevent unusual heat generation due to high electric currents. The gasket 210 is made of, for example, an insulating material and asphalt is applied to the surface thereof.

The spiral electrode body 220 is wound around, for example, a center pin 212. A cathode lead 213 containing aluminum Al or the like is connected to the cathode 202 of the spiral electrode body 220, and an anode lead 214 containing nickel Ni or the like is connected to the anode 203. The cathode lead 213 is welded to the safety valve mechanism 208 to be electrically connected with the battery lid 207. The anode lead 214 is welded to the battery can 201 to be electrically connected.

[Cathode]

Figure 7:
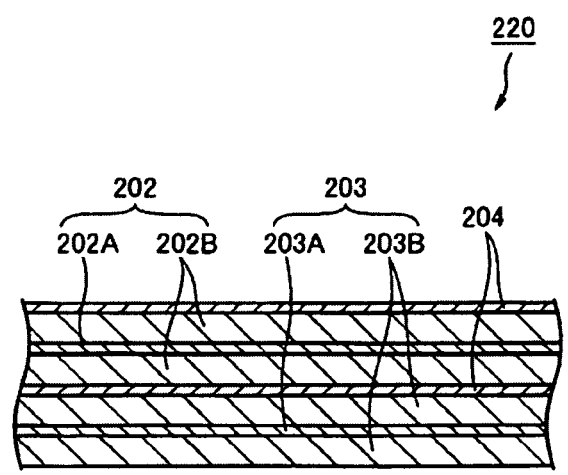
FIG. 7 is a partly enlarged cross-sectional view showing the spiral electrode body in the battery shown in FIG. 6.

FIG. 7 is a partly enlarged view of the spiral electrode body 220 shown in FIG. 6. As shown in FIG. 7, the cathode 202 has a structure, for example, where a cathode current collector 202A has a pair of opposed surfaces and a cathode mixture layer 202B is provided on both sides of the cathode current collector 202A. In addition, the cathode 202 may have an area in which the cathode mixture layer 202B may be provided only on one side of the cathode current collector 202A. The cathode current collector 202A is made of a metallic foil such as aluminum Al foil. The cathode mixture layer 202B contains, for example, a cathode active material and further may contain a conductive agent such as graphite and a binder such as polyvinylidene fluoride, if necessary.

As the cathode active material, a cathode material capable of occluding and releasing lithium can be used. Specific examples of the cathode material include lithium containing compounds such as lithium oxide, lithium phosphorus oxide, lithium sulfide and an intercalation compound containing lithium. Two or more of them may be used in combination. In order to obtain a high energy density, it is preferable to use lithium containing compounds which include lithium Li, transition metal element, and oxygen O. Among them, the lithium containing compound which includes at least one selected from the group consisting of cobalt Co, nickel Ni, manganese Mn, and iron Fe as transition metal element is more preferable.

Examples of the lithium containing compound include lithium composite oxides having an average composition represented by Chemical Formula I, more specifically Chemical Formula II and lithium composite oxides having an average composition represented by Chemical Formula III.

$$Li_pNi_{(1-q-r)}Mn_qM1_rO_{(2-y)}X_z \qquad \text{(Chemical Formula I)}$$

(wherein M1 represents at least one selected from the group consisting of elements of Groups 2 to 15 except for nickel Ni and manganese Mn. X represents at least one selected from the group consisting of elements of Group 16 and Group 17 except for oxygen O. Values of p, q, r, y, and z are in the range of $0 \leq p \leq 1.5$, $0 \leq q \leq 1.0$, $0 \leq r \leq 1.0$, $-0.10 \leq y \leq 0.20$, and $0 \leq z \leq 0.2$.)

$$Li_aCo_{1-b}M2_bO_{2-c} \qquad \text{(Chemical Formula II)}$$

(wherein, M2 represents at least one selected from the group consisting of vanadium V, copper Cu, zirconium Zr, zinc Zn, magnesium Mg, aluminum Al, gallium Ga, yttrium Y, and iron Fe. Values of a, b, and c are in the range of $0.9 \leq a \leq 1.1$, $0 \leq b \leq 0.3$, and $-0.1 \leq c \leq 0.1$. The composition of lithium changes depending on the charge-discharge state. The value of a represents a value in full discharged state.)

$$Li_wNi_xCo_yMn_zM3_{1-x-y-z}O_{2-v} \qquad \text{(Chemical Formula III)}$$

(wherein, M3 represents at least one selected from the group consisting of vanadium V, copper Cu, zirconium Zr, zinc Zn, magnesium Mg, aluminum Al, gallium Ga, yttrium Y, and iron Fe. Values of v, w, x, y, and z are in the range of $-0.1 \leq v \leq 0.1$, $0.9 \leq v \leq 1.1$, $0 < x < 1$, $0 < y < 1$, $0 < z < 0.5$, and $0 \leq 1-x-y-z$. The composition of lithium changes depending on the charge-discharge state. The value of w represents a value in full discharged state.)

Further, examples of the lithium containing compound include lithium composite oxide having a spinel-type structure represented by Chemical Formula IV. More specifically, the example includes $Li_dMn_2O_4$ ($d \approx 1$), and the like.

$$Li_pMn_{2-q}M4_qO_rF_s \qquad \text{(Chemical Formula IV)}$$

(wherein, M4 represents at least one selected from the group consisting of cobalt Co, nickel Ni, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W. Values of p, q, r, and s are in the range of $0.9 \leq p \leq 1.1$, $0 \leq q \leq 0.6$, $3.7 \leq r \leq 4.1$, and $0 \leq s \leq 0.1$. The composition of lithium changes depending on the charge-discharge state. The value of p represents a value in full discharged state.)

Further, examples of the lithium containing compound include lithium composite phosphate having an olivine-type structure represented by Chemical Formula V, more specifically Chemical Formula VI. More specifically, the example includes $Li_eFePO_4$ ($e \approx 1$).

$$Li_aM5_bPO_4 \qquad \text{(Chemical Formula V)}$$

(wherein, M5 represents at least one selected from the group consisting of elements of Groups 2 to 15. Values of a and b are in the range of $0 \leq a \leq 2.0$ and $0.5 \leq b \leq 2.0$.

$$Li_tM6PO_4 \qquad \text{(Chemical Formula VI)}$$

(wherein, M6 represents at least one selected from the group consisting of cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr. A value of t is in the range of $0.9 \leq t \leq 1.1$. The composition of lithium changes depending on the charge-discharge state. The value of t represents a value in full discharged state.)

In addition to the above-described cathode materials, examples of the cathode material capable of occluding and releasing lithium Li include inorganic compounds not containing lithium such as $MnO_2$, $V_2O_5$, $V_6O_{13}$, NiS, and MoS.

[Anode]

The anode 203 has a structure, for example, where an anode mixture layer 203B is provided on both sides of an anode current collector 203A which has a pair of opposed surfaces. The anode mixture layer 203B may be provided only on one side of the anode current collector 203A, which is not illustrated. The anode current collector 203A is made of, for example, a metallic foil such as copper foil.

The anode mixture layer 203B is made including any one, or two or more of the anode material capable of occluding and releasing lithium as an anode active material and may be also made including the same binder as the cathode mixture layer 202B, if necessary.

In the nonaqueous electrolyte battery, the electrochemical equivalent of the anode material capable of occluding and releasing lithium is larger than the electrochemical equivalent of the cathode 221. Thus, lithium metal is not precipitated on the anode 203 during the charge.

Further, the nonaqueous electrolyte battery is designed so that an open circuit voltage (namely, battery voltage) in the full charge state is within, for example, a range of 4.2 V to 4.6 V. For example, in the case where the open circuit voltage in the full charge state is 4.25 V or more, the discharge of lithium per unit mass is increased more than that of the battery of 4.2 V even if the same cathode active material is used. Depending on the case, the amount of the cathode active material and the anode active material is adjusted, thereby obtaining a high energy density.

Examples of the anode material capable of occluding and releasing lithium include carbon materials such as graphite, non-easy-graphitizable carbon, easy-graphitizable carbon, pyrolytic carbons, cokes, glassy carbons, organic polymer compound firing products, carbon fiber or activated carbon. Examples of such a coke include pitch coke, needle coke, or petroleum coke. Organic polymer compound firing products are obtained by firing and carbonizing polymeric materials such as a phenol resin and a furan resin at suitable temperatures. Some of them are categorized as non-easy-graphitizable carbon or easy-graphitizable carbon. Examples of the polymeric material include polyacethylene or polypyrrole. These carbon materials are desirable because there is very little change of the crystal structure thereof produced in charge and discharge and a high charge-discharge capacity and an excellent cycle characteristics can be obtained. Particularly, graphite is preferable since a large electrochemical equivalent and a high energy density can be obtained. Further, non-easy-graphitizable carbon is preferable since an excellent characteristic can be obtained. Furthermore, a carbon material having a low charge-discharge potential, specifically, a carbon material having a charge-discharge potential close to that of lithium metal are preferable because a high energy density of the battery is easily realized.

Examples of the anode material capable of occluding and releasing lithium include materials capable of occluding and releasing lithium which contain at least one of metal elements and metalloid elements as a constituting element. The use of such a material allows for obtaining a high energy density. When they are used in combination with, particularly, carbon materials a high energy density and excellent cycle characteristics can be obtained, which is more preferable. Examples of the anode material may include the simple substance, alloy, and compound of the metal element or the metalloid element, or materials having the phases of one, or two ore more such materials in at least one part thereof. In the present embodiments, an alloy including one or more metallic elements and one or more metalloid elements is included in addition to an alloy including two or more metallic elements. Additionally, a nonmetallic element may be included. Examples of the structures of the materials include a solid solution, an eutectic (eutectic mixture), an intermetallic compound or a concomitant state of two or more of the structures.

Examples of a metal element constituting the anode material or a metalloid element include magnesium Mg, boron B, aluminium Al, gallium Ga, Indium In, silicon Si, germanium Ge, tin Sn, lead Pb, bismuth Bi, cadmium Cd, silver Ag, zinc Zn, hafnium Hf, zirconium Zr, yttrium Y, palladium Pd, or platinum Pt. These elements may be a crystalline substance or amorphous.

Among them, preferable examples of the anode material include materials which contain metal elements or metalloid elements of Group 4B of the short period periodic table as the constituent element. The materials which contain at least one of silicon Si and tin Sn as the constituent element are particularly preferable. This is because silicon Si and tin Sn have a large ability to occlude and release lithium Li and a high energy density can be obtained.

Examples of the alloy of tin Sn include alloys containing at least one among the group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than tin Sn. Examples of the alloy of silicon Si include alloys containing at least one among the group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than silicon Si.

As a compound of tin Sn or a compound of silicon Si, for example, a compound containing oxygen O or carbon C is listed. In addition to tin Sn or silicon Si, the second constituting element described above may be contained.

Examples of the anode material capable of occluding and releasing lithium further include other metallic compounds or polymeric materials. Examples of other metallic compounds include oxides such as $MnO_2$, $V_2O_5$, and $V_6O_{13}$; sulfides such as NiS and MoS; or lithium nitrides such as $LiN_3$. Examples of the polymeric material include polyacethylene, polyaniline or polypyrrole.

[Electrolytic Solution]

A nonaqueous electrolytic solution obtained by dissolving an electrolyte salt in a nonaqueous solvent can be used as an electrolytic solution. It is preferable that the nonaqueous solvent contains at least either ethylene carbonate or propylene carbonate. This is because the cycle characteristics can be improved. Particularly, when ethylene carbonate and propylene carbonate are mixed and contained, the cycle characteristics can be further improved, which is preferable. It is preferable that the nonaqueous solvent contains at least one of chain carbonate esters such as diethyl carbonate, dimethyl carbonate, ethyl methyl carbonate, or methyl propyl carbonate. This is because the cycle characteristics can be further improved.

It is preferable that the nonaqueous solvent further contains at least either 2,4-difluoroanisole or vinylene carbonate. This is because 2,4-difluoroanisole can improve the discharging capacity and vinylene carbonate can further improve the cycle characteristics. Particularly, when these material are mixed and contained, both the discharging capacity and cycle characteristics can be improved, which is more preferable.

The nonaqueous solvent further may include any one, or two or more of butylene carbonate, γ-butyrolactone, γ-valerolactone, solvents in which a part or all of hydrogen groups of these compounds are substituted by a fluorine group, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxy propionitrile, N,N-dimethyl formamide, N-methylpyrrolizinone, N-methyloxazolidinone, N,N-dimethyl imidazolidinone, nitromethane, nitroethane, sulfolane, dimethyl sulfoxide, or trimethyl phosphate.

Depending on the combination of the electrode, the reversibility of electrode reaction may be improved by using the solvent in which a part or all of hydrogen atoms of the substance contained in the above-described nonaqueous solvent group are substituted by a fluorine atom. Therefore, these substances can be conveniently used.

Suitable examples of the lithium salt which is an electrolyte salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2$ (ox) [lithium difluoro oxalate borate], LiBOB [lithium bisoxalate borate] or LiBr. The lithium salts may be used alone or two or more of them may be used in combination. Among them, LiPF6 is preferable because a high ion-conductivity can be obtained and cycle characteristics can be improved.

[Separator]

The separator 204 separates the cathode 202 from the anode 203 and allows lithium ion to be passed while the short circuit of the electric current due to the contact of the cathode and the anode is prevented.

Figure 8:
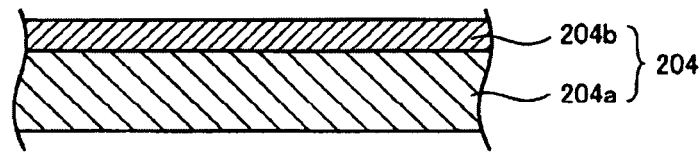
FIG. 8 is an enlarged sectional view showing an example of the separator of the battery according to the third embodiment.

The separator 204 has a multilayer structure of two or more layers. At least, it has a first resin layer 204a of polyolefin resin and a second resin layer 204b containing the resin with a structure in which a framework of 1 μm or less in diameter is joined in the form of a three-dimensional mesh. FIG. 8 shows an example of the separator 204. As shown in FIG. 8, the separator 204 has two layer structures of the first resin layer 204a and the second resin layer 204b.

Examples of the first resin layer 204a to be used herein include polyolefin resins such as polyethylene (PE) and polypropylene (PP) or a fine porous film made of a mixture of such polyolefin resins. Preferably, the resin with a melting point of 135° C. or more can be used. The polyolefin resins have a shutdown function in which the electric current is blocked by clogging of the hole area at a temperature near the melting point.

Figure 9:
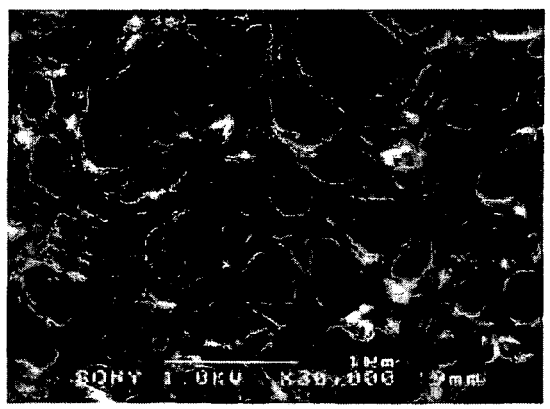
FIG. 9 is a SEM image for illustrating a structure of the second resin layer.

The second resin layer 204b contains the resin with a structure in which a framework of 1 μm or less in diameter is joined in the form of a three-dimensional mesh. The structure in which a framework of 1 μm or less in diameter is joined in the form of a three-dimensional mesh can be confirmed by observing with the Scanning Electron Microscope (SEM). An example of the SEM image obtained by observing the second resin layer 204b with the SEM is shown in FIG. 9. Since the second resin layer 204b has the structure in which a framework of 1 μm or less in diameter is joined in the form of a three-dimensional mesh, it is excellent in impregnation property of the electrolytic solution. Further, the structure can have a large void ratio and thus it is excellent in ionic permeability.

It is preferable that the rate of hole area in the surface of the second resin layer 204b is in the range of 30% to 80%. This is because the ionic conductivity is prevented when the rate of hole area in the surface is too small and the function imparted by the resin becomes insufficient when the rate of hole area in the surface is too large.

Figure 10A:
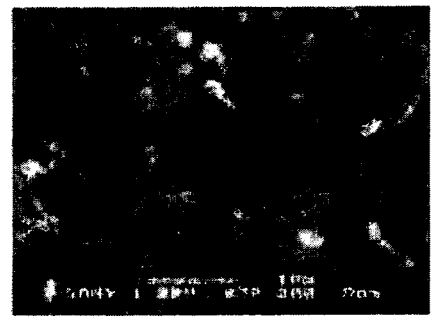
FIG. 10A and FIG. 10B are SEM images for illustrating structures of the second resin layer.
Figure 10B:
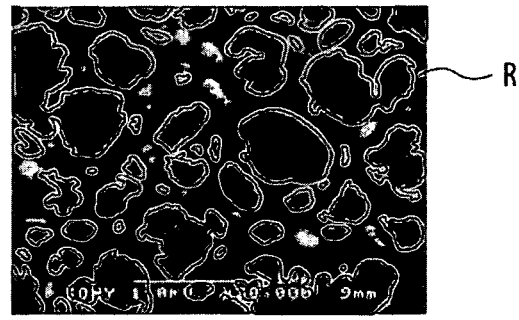

Here, the rate of hole area in the surface is observed with the SEM and it is calculated, for example, as described below. In the SEM image observed using the SEM as shown in FIG. 10A, a depth of 1 μm of the framework diameter below the surface is framework-occupation area. As shown in FIG. 10B, the calculation is carried out using a region R which is extracted by image processing as framework-occupation area. The rate of hole area in the surface is calculated by dividing the value found by subtracting the framework-occupation area from the area of the whole SEM image by the area of the whole SEM image. Namely, the value can be determined by the equation "rate of hole area in the surface (%)"={("whole area"–"framework-occupation area")/"whole area"}×100(%).

A solution obtained by dissolving the resin in a solvent such as N-methyl-2-pyrrolidone (NMP) at ordinary temperature is applied onto the first resin layer 204a by using a desktop coater, which is then placed in a hydrophobic solvent such as water to separate the phase. Then, the resulting product is dried by hot air to form the second resin layer 204b.

In such a method, the second resin layer 204b is formed by a phase-separation phenomenon rapidly induced by hydrophobic solvent and the second resin layer 204b has the structure in which a framework of the resin is joined in the form of a fine three-dimensional mesh. That is, when a solution obtained by dissolving the resin brings into contact with a solvent which is hydrophobic to the resin and hydrophilic to a solvent which dissolves the resin, the solvent exchange occurs and rapid (high speed) phase separation that accompanies the spinodal decomposition is generated. Thus, the resin has a characteristic form of a three-dimensional mesh.

In the wet method (phase separation method) which is generally used in the production of the separator in related art, a solution obtained by mixing a resin with a solvent and dissolving by heating is sheeted and then cooled. Then, the phenomenon of temperature-induced phase separation in which the resin is precipitated as a solid is generated, thereby forming a member of an opening portion (portion where the solvent is present). Thereafter, the member is drawn and then the solvent is extracted and removed with another solvent to form a porous structure. On the other hand, in the second resin layer 204b of the separator 204 to be used in an embodiment, a characteristic porous structure is formed by utilizing not the phenomenon of temperature-induced phase separation which is used in the wet method, but the phase-separation phenomenon rapidly induced by hydrophobic solvent that accompanies the spinodal decomposition. Further, the excellent impregnation property of the electrolytic solution and ionic conductivity can be realized by the structure.

Preferable examples of the resin to be used for the second resin layer 204b include fluorine resins such as polyvinylidene fluoride and polytetrafluoroethylene based on the viewpoint that they are excellent in impregnation property of the electrolytic solution and the retention of the electrolytic solution and can give the flexibility.

Further, a heat resistant resin which is excellent in heat resistance can be used as the resin to be used for the second resin layer 204b. Thus, a separator excellent in heat-resistant stability can be provided without impairing the ionic conductivity and a high safety can be provided to the battery.

From the viewpoint of dimensional stability wider high temperature atmosphere, a resin having a glass transition temperature as high as possible is desirable as the heat resistant resin. From the viewpoint that the dimensional change and shrinkage by flow can be reduced, a resin which has a fusion entropy and does not have a melting point can be preferably used. Examples of such resin include polyamide having an aromatic framework (for example, aramid), polymer having an aromatic framework and an imide bond (for example, polyimide) or copolymers of monomers constituting these polymers (for example, polyamidoimide).

When a mixture of heat resistant resin with fluorine resin is used as a resin to be used for the second resin layer 204b, a heat-resistant layer having an excellent flexibility and adhesion can be formed, which is thus preferable.

Further, the resin to be used for the second resin layer 204b may contain glass. Here, the term "glass" means the glass which has the $SiO_4$ tetrahedral structure phase of the SiO bond.

As a raw material of glass, polysilazane compound can be preferably used. The compound can be converted to glass by reaction of water content. In the case where the raw material is blended with resin for use, the electrochemical stability can be given by locating glass on a framework in which the form of a three-dimensional mesh is formed. From the viewpoint of the heat resistance of glass, the separator 204 in which the heat stability is improved can be obtained. The mixed form of glass and resin and the existence form should not be limited and they may include the $SiO_4$ tetrahedral structure phase of "Si—O bond" and a phase of "C—C bond". Regardless of the bond form of "C—C bond", examples thereof include a single bond, a double bond, a conjugated double bond, and a triple bond. The size of these phases is preferably in the range of several to several tens nanometers.

Figure 11:
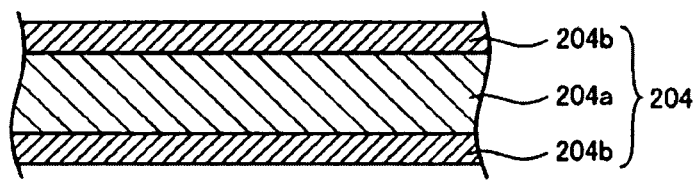
FIG. 11 is an enlarged sectional view showing another example of the separator of the battery according to the third embodiment.

As for the separator 204, the second resin layer 204b may be formed on both sides of the first resin layer 204a as shown in FIG. 11. The structure in which the second resin layer 204b is formed on both sides of the first resin layer 204a can improve the heat resistance, which is thus preferable. In this regard, the structure of the separator 204 is not limited to the structures described above and it may have, for example, four or more layers. As shown in FIGS. 8 and 11, the second resin layer 204b does not need to be formed on the nearest surface of the separator 204 and it may be formed on an inner layer of the nearest surface.

It is preferable that the separator 204 has an area heat shrinkage ratio of 60% or less at 200° C.

It is preferable that the thrust strength of the separator 204 is in the range of 100 gf to 1000 gf. This is because a short-circuit may be generated when the thrust strength is low and the ionic conductivity is decreased when the thrust strength is high.

It is preferable that the air permeability of the separator 204 is in the range of 30 sec/100 cc to 1000 sec/100 cc. This is because a short-circuit may be generated when the air permeability is low and the ionic conductivity is decreased when the air permeability is high.

Next, the method for manufacturing the nonaqueous electrolyte battery according to the third embodiment will be described. Hereinafter, the method for manufacturing the nonaqueous electrolyte battery will be described with reference to an example of a nonaqueous electrolyte battery with a cylindrical shape.

The cathode 202 is fabricated as described below. First, for example, the cathode active material, conductive agent, and binding agent are mixed to prepare a cathode mixture and then the cathode mixture is dispersed in a solvent such as N-methyl-2-pyrrolidone to give a cathode mixture slurry.

Next, the cathode mixture slurry is applied to the cathode current collector 202A and the solvent is dried, followed by compression molding with a roll presser to form the cathode mixture layer 202B. Then, the cathode 202 is fabricated.

The anode 203 is fabricated as described below. First, for example, the anode active material and the binding agent are mixed to prepare an anode mixture and then the anode mixture is dispersed in a solvent such as N-methyl-2-pyrrolidone to give an anode mixture slurry.

Next, the anode mixture slurry is applied to the anode current collector 203A and the solvent is dried, followed by compression molding with a roll presser to form the anode mixture layer 203B. Then the anode 203 is fabricated.

Next, the cathode lead 213 is fixed to the cathode current collector 202A with welding or the like, and the anode lead 214 is fixed to the anode current collector 203A with welding or the like. Then, the cathode 202 and the anode 203 are wound sandwiching the separator 204 therebetween, a tip portion of the cathode lead 213 is welded to the safety valve mechanism 208, a tip portion of the anode lead 214 is welded to the battery can 201, and the wound cathode 202 and anode 203 are sandwiched between a pair of the insulating plates 205 and 206, and then housed inside the battery can 201.

Subsequently, the electrolytic solution is injected into the battery can 201 so as to be impregnated into the separator 204. Then, the battery lid 207, the safety valve mechanism 208, and the PTC element 209 are caulked and fixed to an opening end of the battery can 201 through the gasket 210. As described above, the nonaqueous electrolyte battery according to the third embodiment is fabricated.

When the nonaqueous electrolyte battery according to the third embodiment is charged, a lithium ion is withdrawn from, for example, the cathode 202 and occluded into the anode 203 via the electrolytic solution. On the other hand, when the nonaqueous electrolyte battery is discharged, a lithium ion is withdrawn from, for example, the anode 203 and occluded into the cathode 202 via the electrolytic solution.

In the separator 204 used for the nonaqueous electrolyte battery in the third embodiment, the first resin layer 204a containing polyolefin resin has shutdown function. The second resin layer 204a containing the resin with the structure in which a framework of 1 μm or less in diameter is joined in the form of a three-dimensional mesh is excellent in impregnation property of the electrolytic solution and the resin function can be imparted without impairing the ionic conductivity.

Figure 12:
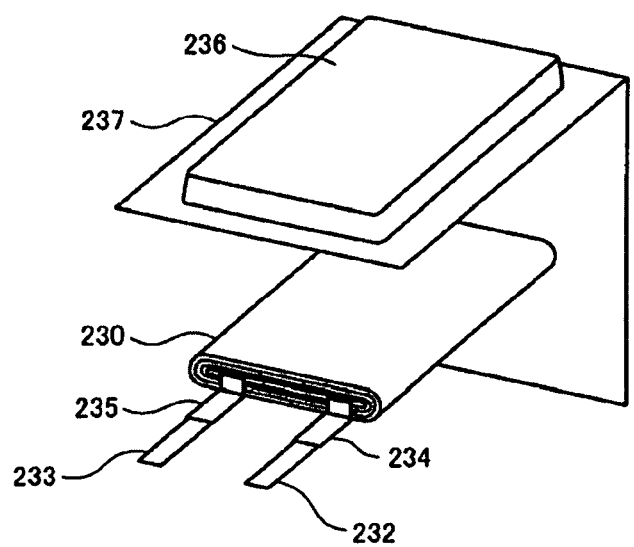
FIG. 12 is a cross-sectional view showing a structure of the battery according to a fourth embodiment.

The fourth embodiment will be described. FIG. 12 shows the structure of the nonaqueous electrolyte battery according to the fourth embodiment. As shown in FIG. 12, the nonaqueous electrolyte battery is fabricated by placing a battery element 230 in an exterior member 237 made of a moisture-proof laminate film and sealing the circumference of the battery element 230 by welding. The battery element 230 has a cathode lead 232 and an anode lead 233 and these leads are inserted into the exterior member 237 and pulled to the outside. The both sides of the cathode lead 232 and the anode lead 233 are coated with a resin section 234 and a resin section 235 in order to improve adhesion to the exterior member 237.
[Exterior Member]

The exterior member 237 has a laminated structure in which, for example, an adhesion layer, a metal layer, and a surface protection layer are sequentially laminated. The adhesion layer is made of a polymeric film. Examples of the material which constitutes the polymeric film include polypropylene (PP), polyethylene (PE), non-drawn polypropylene (CPP), linear low density polyethylene (LLDPE), and low density polyethylene (LDPE). The metal layer is made of a metallic foil. Examples of the material which constitutes the metallic foil include aluminium Al. Further, metals other than aluminium can also be used as the material which constitutes the metallic foil. Examples of the material which constitutes the surface protection layer include nylon Ny and polyethylene terephthalate (PET). In this regard, the surface of the side of the adhesion layer is a storage surface of the side which houses the battery element 30.
[Battery Element]

Figure 13:
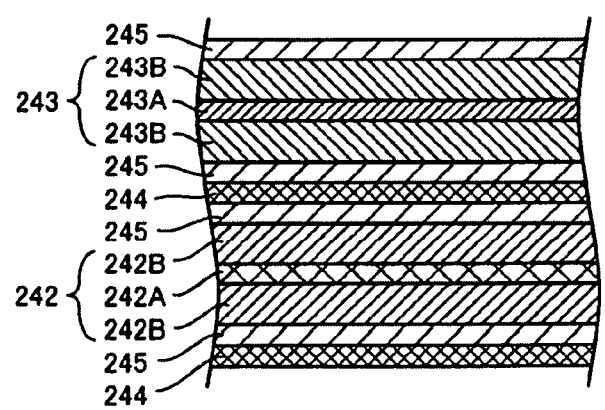
FIG. 13 is a cross-sectional view of a battery element shown in FIG. 12.

For example, as shown in FIG. 13, the battery element 230 is a spiral battery element 230 which is formed by stacking a band-like anode 243 in which a gel electrolyte layer 245 is formed on both sides, a separator 244, a band-like cathode 242 in which the gel electrolyte layer 245 is formed on both sides, and the separator 244 and winding in a longitudinal direction. In this regard, the structure of the separator 244 is the same as the third embodiment, a detailed description will not be repeated here.

The cathode 242 includes the band-like cathode current collector 242A and a cathode mixture layer 242B which is formed on both sides of the cathode current collector 242A. The cathode current collector 242A is made of a metallic foil such as aluminum Al.

The cathode lead 232 which is connected by, for example, spot welding or ultrasonic welding is provided at one end in a longitudinal direction of the cathode 242. Examples of the material of the cathode lead 232 to be used herein include metals such as aluminium.

The anode 243 includes the band-like anode current collector 243A and an anode mixture layer 243B which is formed on both sides of the anode current collector 243A. The anode current collector 243A is made of metal foil such as copper Cu foil, nickel foil, or stainless steel foil.

As with the cathode 242, the anode lead 233 which is connected by, for example, spot welding or ultrasonic welding is also provided at one end in a longitudinal direction of the anode 243. Examples of the material of the anode lead 233 to be used herein include copper Cu, nickel Ni and the like.

Since the embodiment other than the gel electrolyte layer 245 is the same as that of the third embodiment, the gel electrolyte layer 245 will be described hereinbelow.

The gel electrolyte layer 245 contains an electrolytic solution and a polymeric compound which is used as a support of the electrolytic solution and is a so-called gel layer. The gel electrolyte layer 245 is preferable because a high ionic conductivity can be obtained and liquid leakage of a battery can be prevented. The structure of the electrolytic solution (namely, a liquid solvent, an electrolyte salt, and an additive agent) is the same as that of the third embodiment.

Examples of a polymeric compound include polyacrylonitrile, polyvinylidene fluoride, copolymers of vinylidene fluoride and hexafluoro propylene, polytetrafluoroethylene, polyhexafluoro propylene, polyethylene oxide, polypropylene oxide, polyphosphazen, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. Particularly, from a viewpoint of electrochemical stability, it is preferable to use polyacrylonitrile, polyvinylidene fluoride, polyhexafluoropropylene, or polyethylene oxide.

Next, the method for manufacturing the nonaqueous electrolyte battery according to the fourth embodiment will be described. First, a precursor solution containing a solvent, an electrolyte salt, a polymeric compound, and a combined solvent is applied to the cathode 242 and the anode 243, respectively and then the combined solvent is volatilized in order to form the gel electrolyte layer 245. In this regard, the cathode lead 232 is previously mounted on the end of the cathode current collector 242A by welding and the anode lead 233 is mounted on the end of the anode current collector 243A by welding.

Next, the cathode 242 and the anode 243 in which the gel electrolyte layer 245 is formed are laminated via the separator 244 to form a layered product. Then, the layered product is wound in a longitudinal direction thereof to form the spiral battery element 230.

Next, the exterior member 237 made of a laminate film is subjected to the deep drawing process to form a concave portion 236 and the battery element 230 is inserted into the concave portion 236. Then, an unprocessed portion of the exterior member 237 is folded on the upper portion of the concave portion 236 and the peripheral portion of the concave portion 236 is sealed by heat welding. As described above, the nonaqueous electrolyte battery according to the fourth embodiment is fabricated.

In the fourth embodiment, the same effect as that of the third embodiment can be obtained.

EXAMPLES

Specific examples will be described in detail. However, the embodiment are not to be construed as being limited to these examples.

Sample 1

A solution obtained by dissolving polyvinylidene fluoride in N-methyl-2-pyrrolidone was applied onto a polyethylene fine porous membrane by using a desktop coater, which was then placed in a water bath to separate the phase. Thereafter, the resulting product was dried by hot air so as to form a resin layer of polyvinylidene fluoride and a separator was fabricated. When the resin layer was observed with the SEM, it was confirmed that the structure in which a framework of 1 µm or less in diameter was joined in the form of a three-dimensional mesh was formed.

As described below, a battery (a size of 543436) was fabricated by using the obtained separator.

98 parts by mass of lithium cobalt oxide, 1.2 parts by mass of polyvinylidene fluoride, 0.8 part by mass of carbon black were dispersed in N-methyl-2-pyrrolidone solvent to obtain an cathode mixture slurry. The cathode mixture slurry was applied to the both sides of the aluminum foil of the cathode current collector, which was dried. Then, the resulting product was pressed to form a cathode mixture layer and a cathode was obtained.

Further, 90 parts by mass of artificial graphite and 10 parts by mass of polyvinylidene fluoride were dispersed in N-methyl-2-pyrrolidone solvent to obtain an anode mixture slurry. The anode mixture slurry was applied to the both sides of the copper foil of the anode current collector 203A, which was dried. Then, the resulting product was pressed to form an anode mixture layer and an anode was obtained.

Next, the cathode lead was fixed to the cathode current collector with welding or the like, and the anode lead was fixed to the anode current collector with welding. Subsequently, the cathode and the anode are stacked via the separator, which was wound and then sandwiched between the exterior members made of aluminum laminated film. The outer edge of the exterior member except one side was stacked. Then, the electrolytic solution was injected into the exterior member and the remaining one side of the outer edge of the exterior member was stacked. In this regard, $LiPF_6$ was dissolved in a mixed solvent obtained by mixing ethylene carbonate (EC) and propylene carbonate (PC) at the same volume ratio so as to be 1 mol/l, which was used as the electrolytic solution. As described above, a battery of Sample 1 was fabricated.

Sample 2

A battery of Sample 2 was fabricated in the same manner as described in Sample 1 except that the concentration of a polyvinylidene fluoride solution was adjusted to change the rate of hole area in the surface in fabricating a separator.

Sample 3

A battery of Sample 3 was fabricated in the same manner as described in Sample 1 except that the concentration of a polyvinylidene fluoride solution was adjusted to change the rate of hole area in the surface in fabricating a separator.

Sample 4

A battery of Sample 4 was fabricated in the same manner as described in Sample 1 except that the concentration of a polyvinylidene fluoride solution was adjusted to change the rate of hole area in the surface in fabricating a separator.

Sample 5

A battery of Sample 5 was fabricated in the same manner as described in Sample 1 except that the concentration of a polyvinylidene fluoride solution was adjusted to change the rate of hole area in the surface in fabricating a separator.

Sample 6

A battery of Sample 6 was fabricated in the same manner as described in Sample 1 except that a solution obtained by dissolving polyvinylidene fluoride in N-methyl-2-pyrrolidone was applied onto a polyethylene fine porous membrane by using a desktop coater, which was directly dried by hot air without phase separation and a separator was fabricated.

Sample 7

A battery of Sample 7 was fabricated in the same manner as described in Sample 1 except that the concentration of a polyvinylidene fluoride solution was adjusted to change the rate of hole area in the surface in fabricating a separator.

The rate of hole area in the surface of the separators used for the batteries of Samples 1 to 7 was measured. Further, a low-temperature characteristic test as to the batteries of Samples 1 to 7 was performed. The resin layer of polyvinylidene fluoride was observed with the SEM and then the rate of hole area in the surface was calculated by the above described method. The low-temperature characteristic test was carried out as described below.

(Low-temperature Characteristic Test)

The discharging capacity (C1) when a battery was fully charged to 4.2 V at IC at room temperature and then it was discharged at 0.5 C at 3.0 V cut off under 20° C. atmosphere and the discharging capacity (C2) when a battery was fully charged to 4.2 V at IC at room temperature and then it was discharged at 0.5 C at 3.0 V cut off under −20° C. atmosphere were measured. Then, "C2/C1" was defined as discharge characteristic at −20° C.

The measured results of Samples 1 to 7 are shown in Table 2.

TABLE 2

|  | FIRST RESIN LAYER | SECOND RESIN LAYER | AREA DENSITY (SECOND RESIN LAYER) [mg/cm$^2$] | RATE OF HOLE AREA IN THE SURFACE [%] | DISCHARGE CHARACTERISTIC AT −20° C. |
|---|---|---|---|---|---|
| SAMPLE 1 | PE | PVdF | 0.20 | 30 | 0.57 |
| SAMPLE 2 | PE | PVdF | 0.20 | 41 | 0.6 |
| SAMPLE 3 | PE | PVdF | 0.20 | 55 | 0.62 |
| SAMPLE 4 | PE | PVdF | 0.20 | 67 | 0.67 |
| SAMPLE 5 | PE | PVdF | 0.20 | 80 | 0.73 |
| SAMPLE 6 | PE | PVdF | 0.20 | 5 | 0.35 |
| SAMPLE 7 | PE | PVdF | 0.20 | 85 | COATED LAYER PEELED OFF |

PE: POLYETHYLENE
PVdF: POLYVINYLIDENE FLUORIDE

As shown in Table 2, in Samples 1 to 5, the discharge characteristic at −20° C. was improved as compared with that of Sample 6. In the case of Sample 6, the discharge characteristic at −20° C. was reduced because the rate of hole area in the surface was small and the ionic conductivity was decreased. In the case of Sample 7, some of polyvinylidene fluoride was peeled off at the time of winding and a uniform polyvinylidene fluoride resin layer could not be formed because the rate of hole area in the surface was large.

Sample 8

A solution obtained by dissolving aramid in N-methyl-2-pyrrolidone was applied onto a polyethylene fine porous membrane by using a desktop coater, which was then placed in a water bath to separate the phase. Thereafter, the resulting product was dried by hot air so as to form a resin layer of aramid with the structure in which a framework was joined in the form of a three-dimensional mesh and the separator 204 was fabricated.

As described below, a cylinder-type battery (a size of 18650) was fabricated by using the obtained separator.

86 parts by mass of lithium cobalt oxide, 4 parts by mass of polyvinylidene fluoride, 10 parts by mass of carbon black were dispersed in N-methyl-2-pyrrolidone solvent to obtain an cathode mixture slurry. The cathode mixture slurry was applied to the both sides of the aluminum foil 15 μm thick of the cathode current collector, which was dried. Then, the resulting product was pressed to form a cathode mixture layer and a cathode was obtained.

Further, 90 parts by mass of artificial graphite and 10 parts by mass of polyvinylidene fluoride were dispersed in N-methyl-2-pyrrolidone solvent to obtain an anode mixture slurry. The anode mixture slurry was applied to the both sides of the copper foil of the anode current collector, which was dried. Then, the resulting product was pressed to form an anode mixture layer and an anode was obtained.

Next, the cathode lead was fixed to the cathode current collector with welding or the like, and the anode lead was fixed to the anode current collector with welding. Thereafter, the cathode and the anode were wound sandwiching the separator therebetween, a tip portion of the cathode lead was welded to the safety valve mechanism, a tip portion of the anode lead was welded to the battery can, and the wound cathode and anode were sandwiched between a pair of the insulating plates, and then housed inside the battery can. After housing the cathode and anode inside the battery can, the electrolytic solution was injected into the battery can so as to be impregnated into the separator.

Here, LiPF$_6$ was dissolved in a mixed solvent obtained by mixing and preparing 35 wt % of ethylene carbonate (EC), 63 wt % of dimethyl carbonate (DMC), and 2 wt % of vinylene carbonate (VC) so that the molal concentration is 1.5 mol/kg, which was used as the electrolytic solution.

Thereafter, the battery lid, the safety valve mechanism, and the PTC element are caulked and fixed to an opening end of the battery can through the gasket. As described above, a cylinder-type battery (a size of 18650) of Sample 6 was obtained.

Sample 9

A battery of Sample 9 was fabricated in the same manner as described in Sample 8 except that the concentration of an aramid solution was adjusted to change the rate of hole area in the surface in fabricating a separator.

Sample 10

A battery of Sample 10 was fabricated in the same manner as described in Sample 8 except that the concentration of an aramid solution was adjusted to change the rate of hole area in the surface in fabricating a separator.

Sample 11

A battery of Sample 11 was fabricated in the same manner as described in Sample 8 except that the concentration of an aramid solution was adjusted to change the rate of hole area in the surface in fabricating a separator.

Sample 12

A battery of Sample 12 was fabricated in the same manner as described in Sample 8 except that the concentration of an aramid solution was adjusted to change the rate of hole area in the surface in fabricating a separator.

Sample 13

A battery of Sample 13 was fabricated in the same manner as described in Sample 8 except that a polyamidoimide solution obtained by dissolving polyamidoimide in N-methyl-2-pyrrolidone was used in place of an aramid solution.

Sample 14

A battery of Sample 14 was fabricated in the same manner as described in Sample 8 except that a solution obtained by dissolving aramid and polyvinylidene fluoride in N-methyl-2-pyrrolidone at a mass ratio (aramid:polyvinylidene fluoride=7:3) was used in place of an aramid solution.

Sample 15

A battery of Sample 15 was fabricated in the same manner as described in Sample 8 except that a solution obtained by dissolving aramid and glass in N-methyl-2-pyrrolidone at a mass ratio (aramid:glass=4:6) was used in place of an aramid solution.

Sample 16

A battery of Sample 16 was fabricated in the same manner as described in Sample 8 except that a polyethylene fine membrane was directly used as a separator.

Sample 17

A battery of Sample 17 was fabricated in the same manner as described in Sample 8 except that the concentration of an aramid solution was adjusted to change the rate of hole area in the surface in fabricating a separator.

Sample 18

A battery of Sample 18 was fabricated in the same manner as described in Sample 8 except that the concentration of an aramid solution was adjusted to change the rate of hole area in the surface in fabricating a separator.

Sample 19

A battery of Sample 19 was fabricated in the same manner as described in Sample 8 except that a solution obtained by dissolving aramid and polyvinylidene fluoride in N-methyl-2-pyrrolidone at mass ratio (aramid:polyvinylidene fluoride=1:9) was used in place of an aramid solution.

The rate of hole area in the surface as well as the area contraction ratio of the separators used for the batteries of Samples 8 to 19 was measured. Further, the batteries of Samples 8 to 19 were subjected to the high temperature storage test and it was checked whether the gas was blown. The second resin layer was observed with the SEM and then the rate of hole area in the surface was calculated by the above described method. The measurement of area contraction ratio and the high temperature storage test were performed as described below.

(Measurement of Area Contraction Ratio)

First, the separator was cut out in a longitudinal direction ((MD)×width direction (TD)=5 cm×5 cm) and two-points were marked at 4 cm intervals along each center. Next, the separator which was placed on a Teflon plate without being fixed was placed in a thermostat heated at 200° C. in advance. After 20 minutes, it was taken out and then the intervals of each of MD and TD which were marked in advance were measured with a vernier caliper. The area contraction ratio was calculated using the following Equation.

Area contraction ratio (%)=100−{[("two-point interval of $MD$ after heat treatment"ב"two-point interval of $TD$ after heat treatment")/("two-point interval of $MD$ before heat treatment (4 cm)"× "two-point interval of $TD$ (4 cm) before heat treatment")]×100} (Equation)

(High Temperature Storage Test)

A battery was charged so that the open circuit voltage in the full charge state was 4.2 V. Then, the battery was left in a thermostat at 140° C. for 1 hour and it was checked whether the gas was blown within 1 hour.

The measured results are shown in FIG. 3.

TABLE 3

| | FIRST RESIN LAYER | SECOND RESIN LAYER | AREA DENSITY (SECOND RESIN LAYER) [mg/cm$^2$] | AREA CONTRACTION RATIO [%] | RATE OF HOLE AREA IN THE SURFACE [%] | HIGH TEMPERATURE STORAGE TEST (AT 140° C. FOR 1 hr) |
|---|---|---|---|---|---|---|
| SAMPLE 8 | PE | ARAMID | 0.20 | 34 | 30 | NO BLOW OF GAS |
| SAMPLE 9 | PE | ARAMID | 0.20 | 53 | 45 | NO BLOW OF GAS |
| SAMPLE 10 | PE | ARAMID | 0.21 | 50 | 56 | NO BLOW OF GAS |
| SAMPLE 11 | PE | ARAMID | 0.19 | 55 | 65 | NO BLOW OF GAS |
| SAMPLE 12 | PE | ARAMID | 0.20 | 58 | 80 | NO BLOW OF GAS |
| SAMPLE 13 | PE | POLYAMIDOIMIDE | 0.20 | 35 | 50 | NO BLOW OF GAS |
| SAMPLE 14 | PE | ARAMID/PVdF = 7/3 | 0.22 | 55 | 45 | NO BLOW OF GAS |
| SAMPLE 15 | PE | ARAMID/GLASS = 4/6 | 0.24 | 31 | 43 | NO BLOW OF GAS |
| SAMPLE 16 | PE | — | — | 100 | — | BLOW OF GAS |
| SAMPLE 17 | PE | ARAMID | 0.20 | 30 | 10 | DIFFICULTY IN CHARGING |
| SAMPLE 18 | PE | ARAMID | 0.20 | 78 | 85 | BLOW OF GAS |
| SAMPLE 19 | PE | ARAMID/PVdF = 1/9 | 0.20 | 90 | 55 | BLOW OF GAS |

PE: POLYETHYLENE
PVDF: POLYVINYLIDENE FLUORIDE

As shown in Table 3, the heat shrinkage of the separator in the case of Samples 8 to 15 and Samples 17 to 19 could be reduced as compared to that of Sample 16. In the case of Sample 17, the charge could not performed because the rate of hole area in the surface was small and the ionic conductivity was significantly low. In the case of Sample 18, the heat shrinkage was large since the rate of hole area in the surface was large and the gas was blown in the high temperature storage test. In the case of Sample 19, the heat shrinkage was large since the compounding ratio of aramid was low and the gas was blown in the high temperature storage test.

Sample 20

A battery of Sample 20 was fabricated in the same manner as described in Sample 8 except that the concentration of an aramid solution was adjusted to change the area density in fabricating a separator.

Sample 21

A battery of Sample 21 was fabricated in the same manner as described in Sample 20 except that the concentration of an aramid solution was adjusted to change the area density in fabricating a separator.

Sample 22

A battery of Sample 22 was fabricated in the same manner as described in Sample 20 except that the concentration of an aramid solution was adjusted to change the area density in fabricating a separator.

Sample 23

A battery of Sample 23 was fabricated in the same manner as described in Sample 20 except that a polyimide solution obtained by dissolving polyimide in N-methyl-2-pyrrolidone was used in place of an aramid solution.

Sample 24

A battery of Sample 24 was fabricated in the same manner as described in Sample 23 except that the concentration of a polyimide solution was adjusted to change the area density in fabricating a separator.

Sample 25

A battery of Sample 25 was fabricated in the same manner as described in Sample 23 except that the concentration of a polyimide solution was adjusted to change the area density in fabricating a separator.

Sample 26

A battery of Sample 26 was fabricated in the same manner as described in Sample 20 except that a polyethylene fine membrane was directly used as a separator.

The area contraction ratio of the separators which were used for the batteries of Samples 20 to 26 was measured. Further, the high temperature storage test as to the batteries of Samples 20 to 26 was performed. The measured results are shown in FIG. 3.

As shown in Table 4, it was found that the heat shrinkage of the separator in the case of Samples 20 to 25 could be reduced as compared to that of Sample 26 and the safety could be improved.

It should be understood by those skilled in the art that various modifications, combinations, sub-combinations and alterations may occur depending on design requirements and other factors insofar as they are within the scope of the appended claims or the equivalents thereof. The embodiments have been described with reference to the lithium-ion secondary battery as example. The present embodiments can be applied to, for example, a nickel-hydrogen battery, a nickel cadmium battery, a lithium-manganese dioxide battery, and a lithium-iron sulfide battery.

In the embodiments and Examples, the so-called lithium ion secondary battery in which the capacity of the anode is represented by a capacity component determined by occlusion and release of lithium has been described. The present embodiments can be similarly applied to the so-called lithium metal secondary battery in which lithium metal is used for the anode active material and the capacity of the anode is represented by a capacity component determined by precipitation and release of lithium or the secondary battery in which the capacity of the anode is represented by the sum of the capacity component determined by occlusion and release of lithium and the capacity component determined by precipitation and release of lithium by lowering the charging capacity of the anode material capable of occluding and releasing lithium than the charging capacity of the cathode.

Further, the nonaqueous electrolyte secondary battery having a winding structure has been described in the embodiments and Examples. The present embodiments can be similarly applied to a battery having a structure in which the cathode and the anode are folded or stacked. In addition, the present embodiments can be applied to the so-called coin type battery, button type battery, square type battery, and the like. Further, the present disclosure can be applied to not only the secondary batteries but also primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for manufacturing a separator comprising:
applying a precursor without solvent, the precursor containing viscous liquid product which contains only pol-

TABLE 4

|  | FIRST RESIN LAYER | SECOND RESIN LAYER | AREA DENSITY (SECOND RESIN LAYER) [mg/cm$^2$] | AREA CONTRACTION RATIO [%] | HIGH TEMPERATURE STORAGE TEST (AT 140° C. FOR 1 hr) |
|---|---|---|---|---|---|
| SAMPLE 20 | PE | ARAMID | 0.124 | 55.0 | NO BLOW OF GAS |
| SAMPLE 21 | PE | ARAMID | 0.197 | 53.0 | NO BLOW OF GAS |
| SAMPLE 22 | PE | ARAMID | 0.358 | 23.0 | NO BLOW OF GAS |
| SAMPLE 23 | PE | POLYIMIDE | 0.130 | 57.0 | NO BLOW OF GAS |
| SAMPLE 24 | PE | POLYIMIDE | 0.182 | 55.0 | NO BLOW OF GAS |
| SAMPLE 25 | PE | POLYIMIDE | 0.257 | 35.7 | NO BLOW OF GAS |
| SAMPLE 26 | PE | — | — | 100 | BLOW OF GAS |

PE: POLYETHYLENE ysilazane compound or a mixture of viscous liquid product which contains only polysilazane compound with polycarbosilazane compound to a polyolefin resin;

placing the precursor applied polyolefin resin in a water bath to form a resulting product; and drying the resulting product.

* * * * *

UNITED STATES PATENT AND TRADEMARK OFFICE
CERTIFICATE OF CORRECTION

PATENT NO. : 8,455,053 B2
APPLICATION NO. : 12/167005
DATED : June 4, 2013
INVENTOR(S) : Kajita et al.

It is certified that error appears in the above-identified patent and that said Letters Patent is hereby corrected as shown below:

ON THE TITLE PAGE OF THE PATENT ITEM (75) INVENTOR:

Change address of Inventor Yukako Teshima from Fukuoka to "Fukushima".

Signed and Sealed this
Twenty-ninth Day of October, 2013

Teresa Stanek Rea
*Deputy Director of the United States Patent and Trademark Office*